(12) United States Patent
Hikima

(10) Patent No.: US 11,682,951 B2
(45) Date of Patent: Jun. 20, 2023

(54) COIL INSERTION GUIDE DEVICE AND COIL INSERTION GUIDE METHOD

(71) Applicant: HONDA MOTOR CO., LTD., Tokyo (JP)

(72) Inventor: Norihiko Hikima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/678,025

(22) Filed: Feb. 23, 2022

(65) Prior Publication Data

US 2022/0302808 A1   Sep. 22, 2022

(30) Foreign Application Priority Data

Mar. 19, 2021   (JP) .............................. JP2021-045747

(51) Int. Cl.
*H02K 15/06* (2006.01)

(52) U.S. Cl.
CPC ......... *H02K 15/062* (2013.01); *H02K 15/066* (2013.01); *Y10T 29/49009* (2015.01); *Y10T 29/49073* (2015.01); *Y10T 29/53143* (2015.01); *Y10T 29/53152* (2015.01)

(58) Field of Classification Search
CPC ...... H02K 3/345; H02K 15/06; H02K 15/062; H02K 15/063; H02K 15/065; H02K 15/066; H02K 15/10; H02K 15/105; Y10T 29/49009; Y10T 29/49073; Y10T 29/53143; Y10T 29/53152

See application file for complete search history.

(56) References Cited

U.S. PATENT DOCUMENTS

| 2016/0233749 | A1* | 8/2016 | Ueno | H02K 15/067 |
| 2017/0141659 | A1 | 5/2017 | Hashimoto et al. | |
| 2020/0076280 | A1* | 3/2020 | Yoshida | H02K 15/024 |
| 2021/0399616 | A1* | 12/2021 | Kato | H02K 15/085 |

FOREIGN PATENT DOCUMENTS

JP    3390772 B2    9/2018

\* cited by examiner

*Primary Examiner* — Peter Dungba Vo
*Assistant Examiner* — Joshua D Anderson
(74) *Attorney, Agent, or Firm* — CKC & Partners Co., LLC

(57) ABSTRACT

A coil insertion guide device includes a positioning jig that positions a stator core; and a guide member that is provided in the positioning jig so as to be able to contact an end face of the stator core in an axial direction. A coil inserted into the slots along the radial direction of the stator core is guided by the guide members. The guide member includes a guide groove. The guide groove includes, on a side close to the end face of the stator core, a cuff support groove that houses and supports a cuff of one of the insulating members that protrudes from the end face of the stator core, and on a side far from the end face, a coil guide groove that protrudes toward an inside of the slot more than the cuff support groove and contacts the coil to guide movement of the coil.

5 Claims, 26 Drawing Sheets

COIL INSERTION GUIDE DEVICE AND COIL INSERTION GUIDE METHOD

This application is based on and claims the benefit of priority from Japanese Patent Application No. 2021-045747, filed on 19 Mar. 2021, the content of which is incorporated herein by reference.

BACKGROUND OF THE INVENTION

Field of the Invention

The present invention relates to a coil insertion guide device and a coil insertion guide method.

Related Art

Conventionally, when a coil in a wound state is inserted into a slot of a stator core by moving the coil from inward to outward in the radial direction of the stator core, a method is known in which a guide jig is placed on the outer peripheral side of the coil in the wound state and the coil is guided by the guide jig (for example, see Patent Document 1).

In this method, an insulating member is pre-mounted on the coil in the wound state, and the guide jig moves the coil and insulating member together toward the slot.
Patent Document 1: Japanese Patent No. 6390772

SUMMARY OF THE INVENTION

However, when the guide jig is used to guide the movement of the coil and insulating member, the guide jig is easily overloaded and damaged. In contrast, when an insulating member is inserted into a slot beforehand, the insulating member may be damaged because a coil bites the insulating member in the slot during insertion of the coil.

It is an object of the present invention to provide a coil insertion guide device and a coil insertion guide method that prevent a coil from biting an insulating member in a slot when the coil is inserted into the slot.

(1) A first aspect of the present invention provides a coil insertion guide device (e.g., the coil insertion guide device 30 described later), including: a positioning jig (e.g., the positioning jig 3 described later) that positions a stator core (e.g., the stator core 2 described later) including a plurality of slots (e.g., the slots 22 described later) each having an opening (e.g., the opening 22a described later) that opens in a radial direction (e.g., the Y direction described later), insulating members (e.g., the insulating papers 24 described later) being respectively inserted into the slots; and a guide member (e.g., the cuff guide 33 described later) that is provided in the positioning jig so as to be able to contact an end face (e.g., the end face 2a described later) of the stator core in an axial direction (e.g., the Z direction described later). A coil (e.g., the strip coil 100 described later) inserted into the slots along the radial direction of the stator core is guided by the guide members. The guide member includes a guide groove (e.g., the guide groove 331 described later). The guide groove includes, on a side close to the end face of the stator core, a cuff support groove (e.g., the cuff support groove 331a described later) that communicates with one of the slots and houses and supports a cuff (e.g., the cuff 24a described later) of one of the insulating members that protrudes from the end face of the stator core, and on a side far from the end face, a coil guide groove (e.g., the coil guide groove 331b described later) that protrudes toward an inside of the slot more than the cuff support groove and contacts the coil to guide movement of the coil.

(2) In a second aspect of the present invention according to the first aspect, the guide member may be formed so as to gradually increase in height from the end face from the opening of the slot along an insertion direction of the coil, and may guide the movement of the coil so that tension (e.g., the tension F described later) along the axial direction of the stator core is applied along with the movement of the coil in the slot guided by the coil guide groove.

(3) In a third aspect of the present invention according to the first or second aspect, a part of the coil guide groove that contacts the coil (e.g., the corners 331c, 333c described later) may have a curved shape.

(4) A fourth aspect of the present invention provides a coil insertion guide method that guides movement of a coil (e.g., the strip coil 100 described later) inserted along a radial direction (e.g., the Y direction described later) of a stator core (e.g., the stator core 2 described later) into a plurality of slots (e.g., the slots 22 described later) of the stator core into which insulating members (e.g., the insulating papers 24 described later) are respectively inserted. The slots each have an opening (e.g., the opening 22a described later) that opens in the radial direction. The method includes contacting a guide member (e.g., the cuff guide 33 described later) with an end face (e.g., the end face 2a described later) of the stator core in an axial direction (e.g., the Z direction described later). The guide member includes a guide groove (e.g., the guide groove 331 described later) including, on a side close to the end face, a cuff support groove (e.g., the cuff support groove 331a described later) that communicates with one of the slots and houses and supports a cuff (e.g., the cuff 24a described later) of one of the insulating members that protrudes from the end face, and on a side far from the end face, a coil guide groove (e.g., the coil guide groove 331b described later) that protrudes toward an inside of the slot more than the cuff support groove and contacts the coil to guide the movement of the coil. The method further includes supporting the cuff by the cuff support groove, and guiding by the coil guide groove the movement of the coil inserted into the slot.

(5) In a fifth aspect of the present invention according to the fourth aspect, the guide member may be formed so as to gradually increase in height from the end face from the opening of the slot along an insertion direction of the coil, and the movement of the coil may be guided so that tension (e.g., the tension F described later) along the axial direction of the stator core is applied to the coil along with the movement of the coil in the slot guided by the coil guide groove.

According to the first aspect, the cuff of the insulating member that is inserted into the slot beforehand is supported by the cuff support groove of the guide groove of the guide member, so that the cuff is positioned with respect to the slot and the movement of the coil in the slot is guided without biting the cuff by the contact of the coil with the coil guide groove of the guide groove. Thus, it is possible to provide the coil insertion guide device that prevents the coil from biting the insulating member in the slot when the coil is inserted into the slot.

According to the second aspect, as the coil is inserted into the slot, tension in the axial direction of the stator core is applied to the coil in the slot, which suppresses the bending of the coil in the slot and damage to the insulating member due to interference between the coil and the insulating member in the slot.

According to the third aspect, since the contact part between the coil and the coil guide groove of the guide member has a curved shape, damage to a protective coating on the surface of the coil is suppressed.

According to the fourth aspect, the cuff of the insulating member that is inserted into the slot beforehand is supported by the cuff support groove of the guide groove of the guide member, so that the cuff is positioned with respect to the slot and the movement of the coil in the slot is guided without biting the cuff by the contact of the coil with the coil guide groove of the guide groove. Thus, it is possible to provide the coil insertion guide method that prevents the coil from biting the insulating member in the slot when the coil is inserted into the slot.

According to the fifth aspect, as the coil is inserted into the slot, tension in the axial direction of the stator core is applied to the coil in the slot, which suppresses the bending of the coil in the slot and damage to the insulating member due to interference between the coil and the insulating member in the slot.

DETAILED DESCRIPTION OF THE INVENTION

Figure 1:
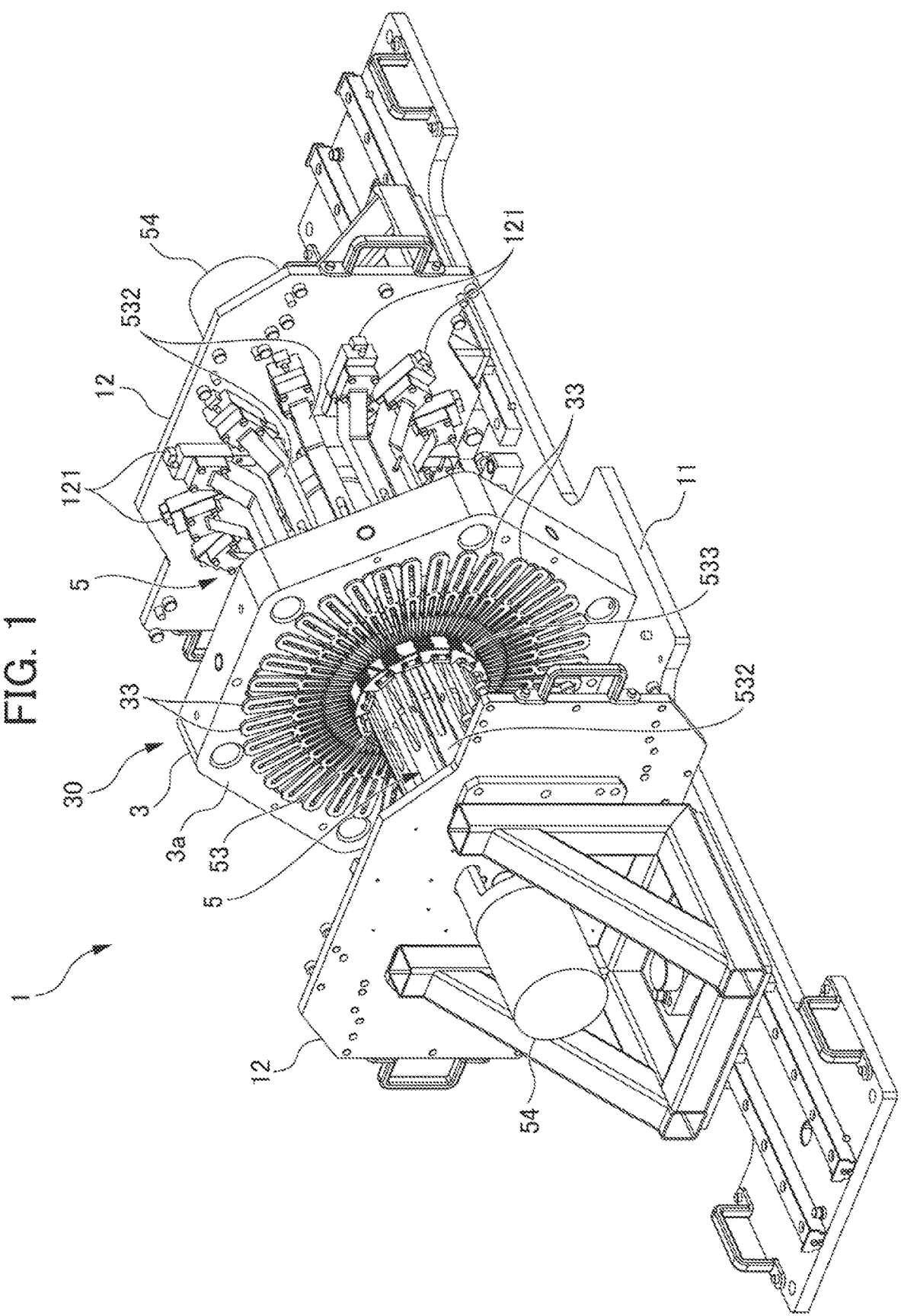
FIG. 1 is a perspective view of a coil mounting apparatus including a coil insertion guide device according to an embodiment of the present invention.

An embodiment of the present invention will now be described in detail with reference to the drawings. FIG. 1 shows a coil mounting apparatus 1 including a coil insertion guide device 30. The coil mounting apparatus 1 includes a stator core 2, a positioning jig 3 that positions and fixes the stator core 2, a coil winding jig 4 that is inserted inside the stator core 2 and winds a strip coil 10 in a circular shape, and a coil expansion device 5 that expands the strip coil 100 wound on the coil winding jig 4.

Figure 2:
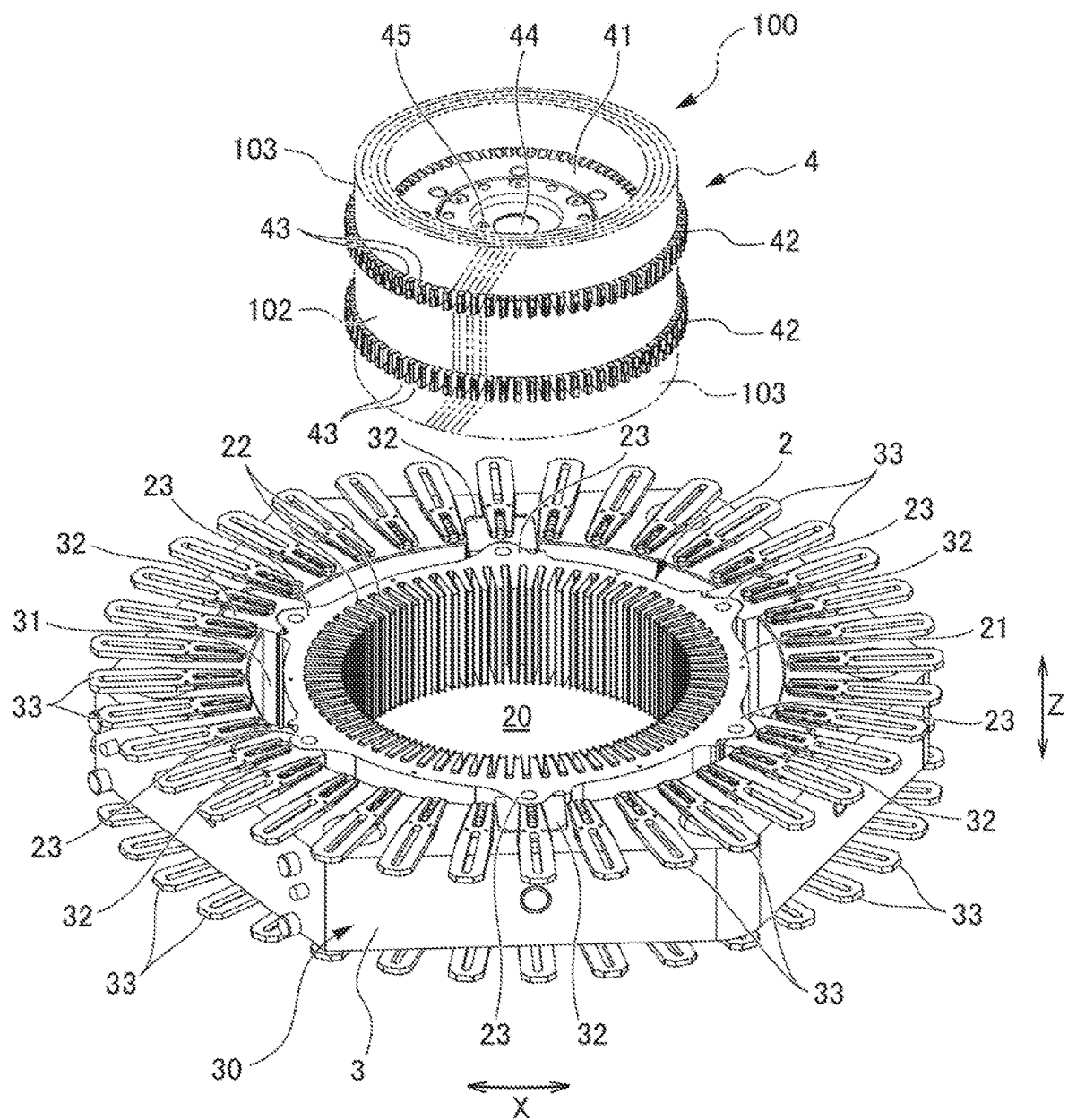
FIG. 2 is an exploded perspective view of the coil insertion guide device with a stator core fixed and a coil winding jig in the coil mounting device.
Figure 3:
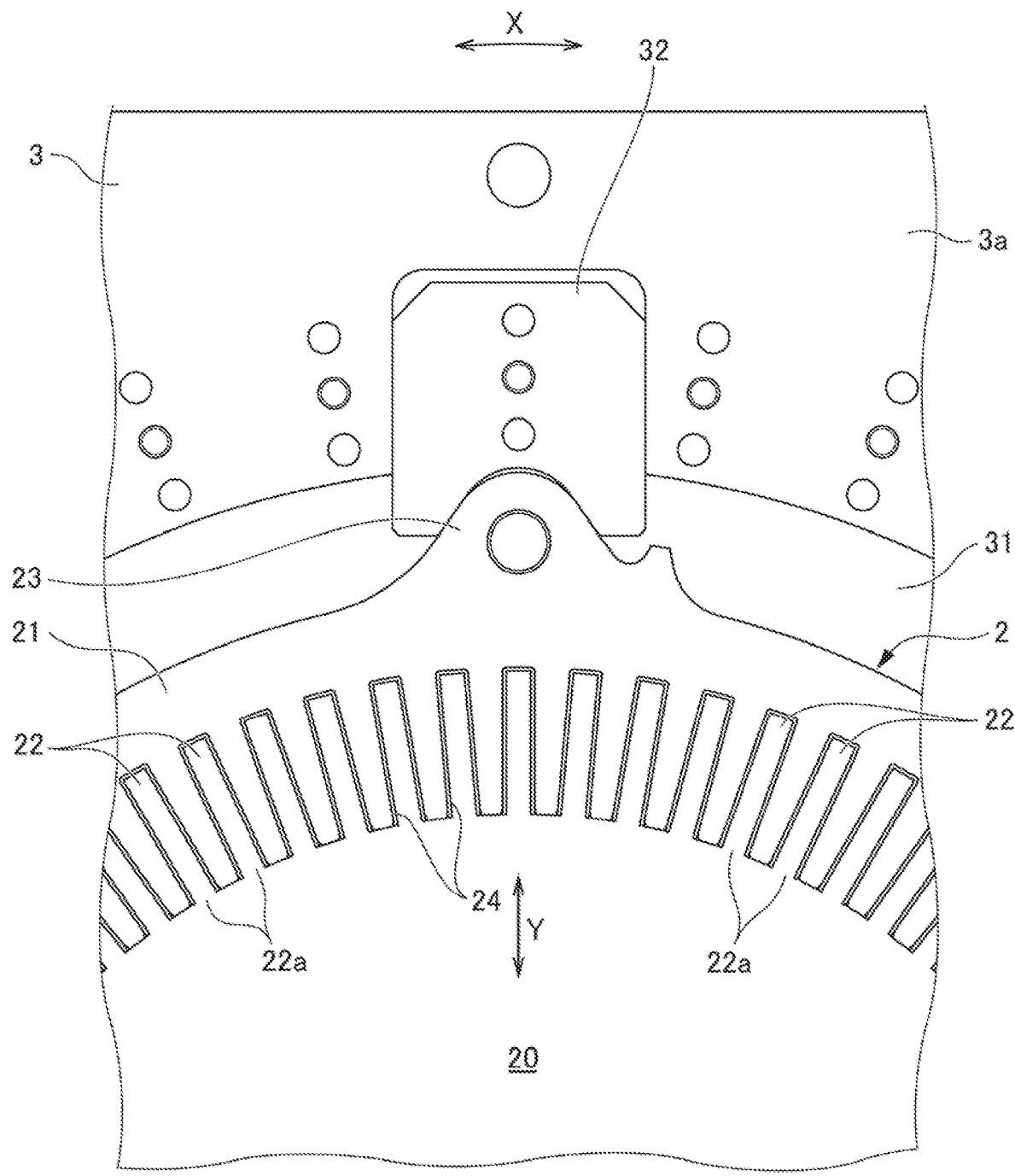
FIG. 3 is an enlarged partial view of a fixed part of the stator core in the coil insertion guide device.

As shown in FIGS. 2 and 3, the stator core 2 includes a circular portion 21, which is formed of, for example, a laminated body in which a plurality of thin core plates are laminated. In the center of the circular portion 21, a through-hole 20 that penetrates in an axial direction is provided. The stator core 2 includes a plurality of slots 22 that penetrate in the axial direction of the stator core 2.

The slots 22 are arranged radially at regular intervals along the circumferential direction of the circular portion 21. The slots 22 each include an opening 22*a* that opens toward the through-hole 20 inward in the radial direction of the circular portion 21. The stator core 2 of this embodiment includes 72 slots 22. At the outer periphery of the circular portion 21 of the stator core 2, six ears 23 that protrude at regular intervals are provided. As shown in FIGS. 2 and 3, in the stator core 2 and the positioning jig 3, the X direction in which the slots 22 are arranged is a circumferential direction, the Y direction along the radial direction from the center of the through-hole 20 is a radial direction, and the Z direction shown in FIG. 2 (perpendicular to the paper surface in FIG. 3) is an axial direction.

As shown in FIGS. 1 to 3, the positioning jig 3 has a hexagonal prism shape with an axial dimension substantially equal to the axial dimension of the stator core 2, and includes in the center a stator core insertion hole 31 into which the stator core 2 can be inserted and placed. In the coil mounting apparatus 1 of this embodiment, the positioning jig 3 is fixed to the center portion of a base 11 of the coil mounting apparatus 1 so that the axial direction of the stator core 2 fixed inside the stator core insertion hole 31 is a horizontal direction.

The positioning jig 3 fixes the stator core 2 inside the stator core insertion hole 31 in a predetermined position and posture. Specifically, as shown in FIGS. 2 and 3, the positioning jig 3 includes six core holding blocks 32 that can be moved so as to protrude and retract with respect to the inside of the stator core insertion hole 31, corresponding to the positions of the six ears 23 of the stator core 2. After the stator core 2 is inserted inside the stator core insertion hole 31, the positioning jig 3 protrudes the core holding blocks 32 toward the inside of the stator core insertion hole 31 by driving an actuator such as a cylinder (not shown). As a result, as shown in FIG. 2, the core holding blocks 32 each grasp the corresponding ear 23 of the stator core 2, and fixes the stator core 2 inside the stator core insertion hole 31 in a predetermined position and posture.

Figure 4:
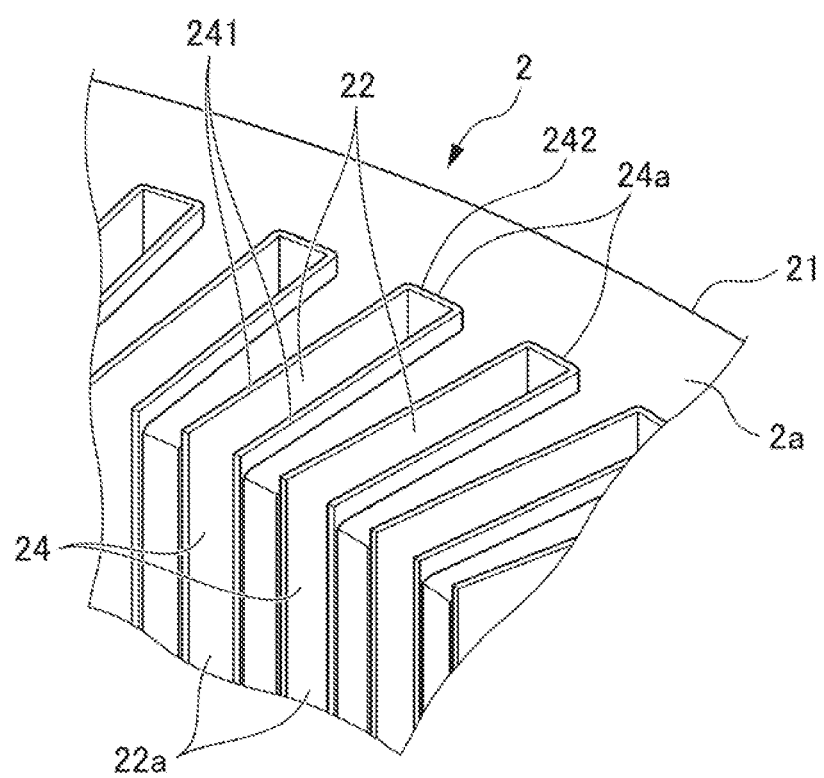
FIG. 4 is a perspective view of insulating members mounted in slots of the stator core.

As shown in FIGS. 3 and 4, insulating papers 24, which are insulating members, are respectively pre-mounted in the slots 22 of the stator core 2. The insulating paper 24 is bent into a substantially U-shape so as to follow the inner face of the slot 22 having a substantially U-shape when the stator core 2 is viewed from an axial direction. That is, the insulating paper 24 includes a pair of radial portions 241, 241 along the inner walls of the slot 22 extending in the radial direction of the stator core 2, and a circumferential portion 242 that connects the radially outer ends of the radial portions 241, 241 along the circumferential direction of the stator core 2.

As shown in FIG. 4, the insulating paper 24 mounted in the slot 22 includes a cuff 24a. The cuff 24a is a part in which the radial portions 241, 241 and the circumferential portion 242 of the insulating paper 24 extend in the axial direction of the stator core 2 and protrude from the slot 22 and project outward from an end face 2a of the stator core 2 in an axial direction. FIG. 4 shows only cuffs 24a of the insulating papers 24 that protrude from one end face 2a of the stator core 2, but cuffs 24a protrude from both end faces 2a, 2a of the stator core 2 in the axial direction.

As shown in FIGS. 1 and 2, a plurality of cuff guides 33 are mounted on both end faces 3a, 3a of the positioning jig 3 in the axial direction, to which the stator core 2 is fixed in advance, to be radially arranged at regular intervals along a circumferential direction. The cuff guide 33 is a guide member that guides the movement of the strip coil 100, which is described below, when the strip coil 100 is inserted into the slot 22 of the stator core 2. The positioning jig 3 and the cuff guides 33 constitute the coil insertion guide device 30. The cuff guides 33 are provided so as to be able to move forward and backward along the radial direction of the stator core 2 by driving an actuator such as a cylinder (not shown). It should be noted that the cuff guides 33 are not shown in FIG. 3 to facilitate understanding of the description of the core holding block 32.

Figure 5:
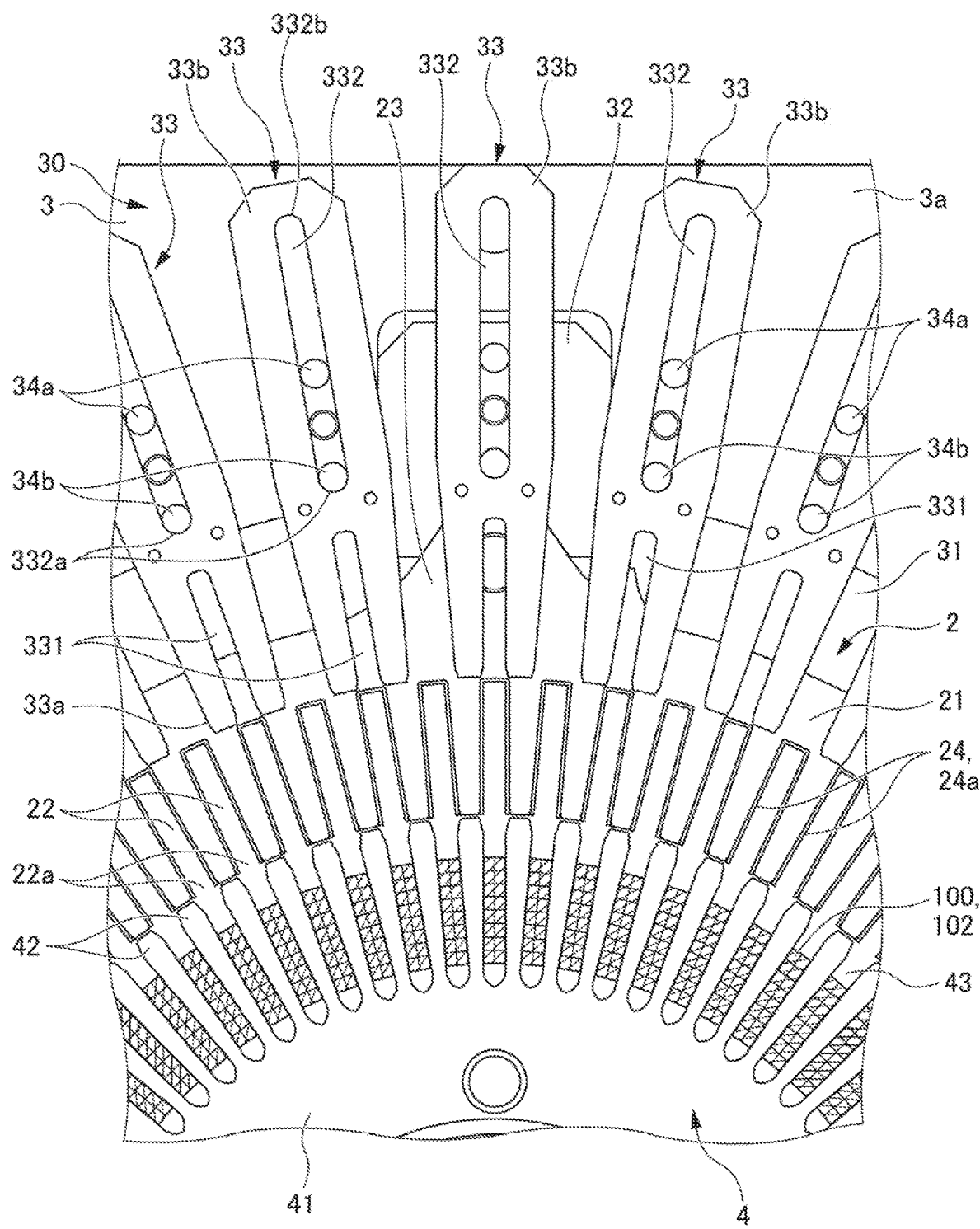
FIG. 5 is an enlarged partial view showing a state in which slots of the stator core and comb-toothed grooves of the coil winding jig are aligned in phase with each other.

The cuff guide 33 is formed in the shape of a long thin sheet along the radial direction of the stator core 2. As shown in FIG. 5, on the side of an inner end 33a of the cuff guide 33, a guide groove 331 is provided that supports the cuff 24a of the insulating paper 24 so as to sandwich the cuff 24a from both sides in the circumferential direction of the stator core 2. The guide groove 331 is cut in a U-shape along the length direction of the cuff guide 33 on the inner end 33a side of the cuff guide 33, and opens toward the inner side of the positioning jig 3. A long hole 332 is provided on an outer end 33b side of the cuff guide 33, to regulate the range of movement in the radial direction of the cuff guide 33.

Figure 6:
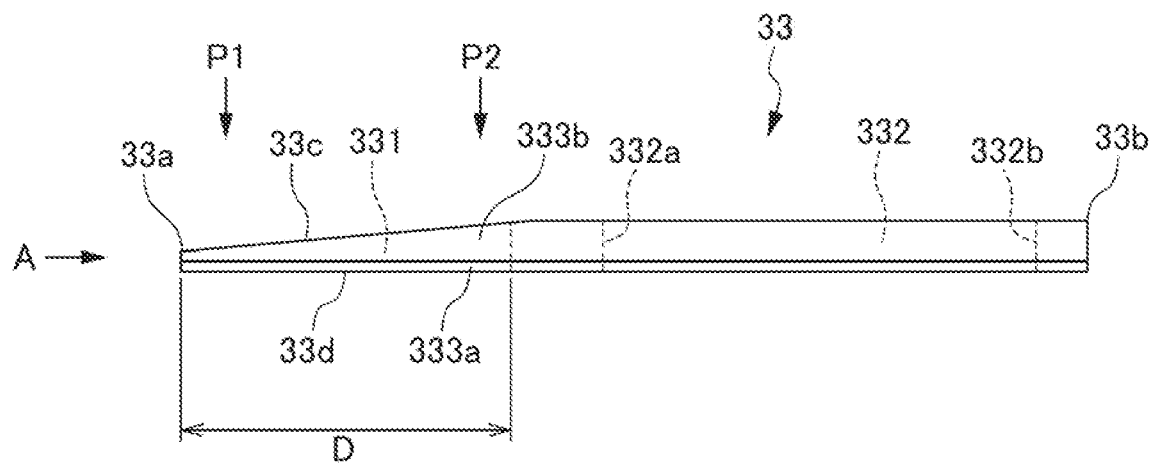
FIG. 6 is a side view of a guide member.
Figure 7:
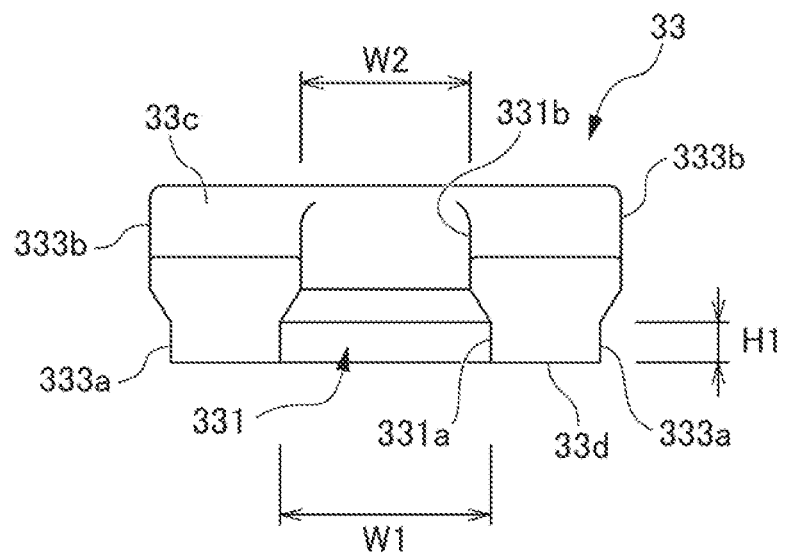
FIG. 7 is a view of the guide member seen from the A direction in FIG. 6.
Figure 8:
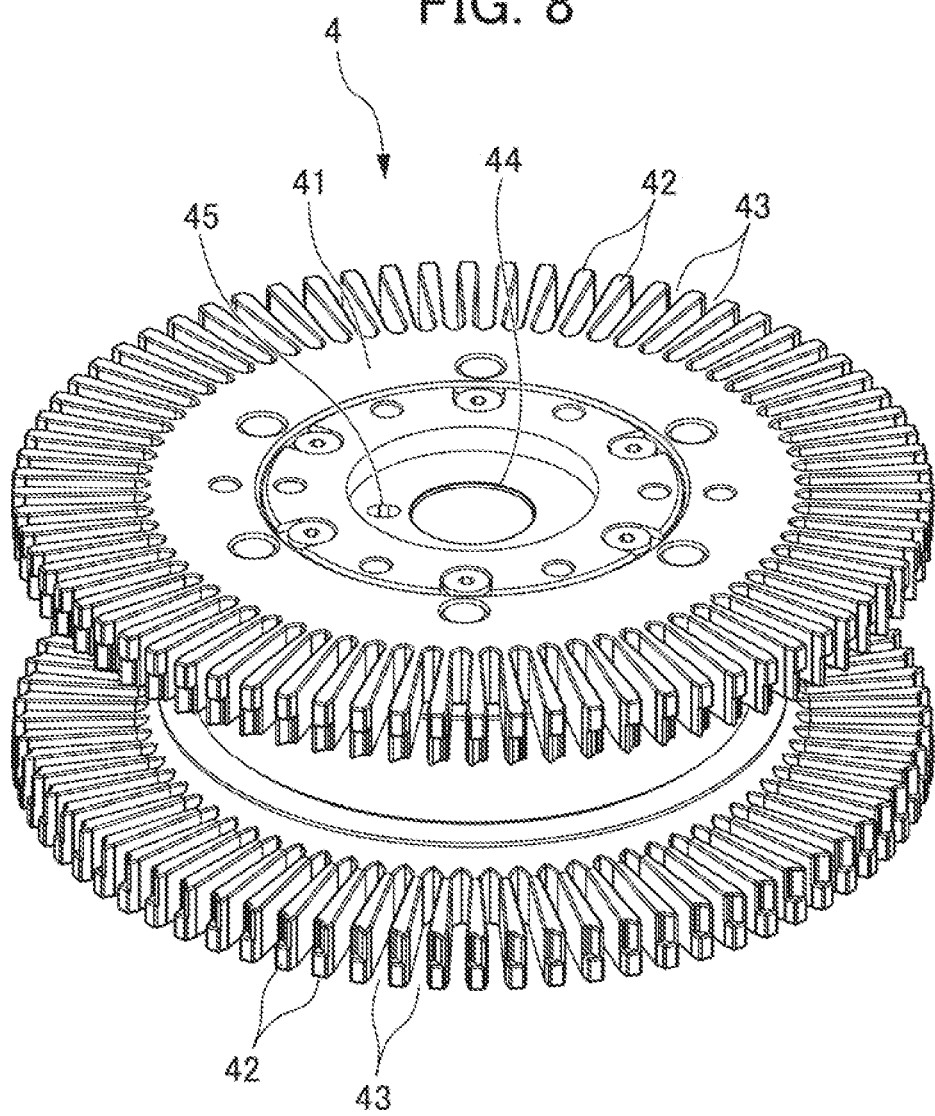
FIG. 8 is a perspective view of the coil winding jig.

As shown in FIGS. 6 and 7, the cuff guide 33 has a tapered face 33c whose thickness becomes gradually thinner toward the inner end 33a than the long hole 332. The tapered face 33c is provided on the opposite side of a bottom face 33d that faces the end face 3a of the positioning jig 3. As a result, the inner end 33a side of the cuff guide 33 is thinner, and the thickness gradually increases toward the outer end 33b. Therefore, when the cuff guide 33 is disposed on the end face 2a of the stator core 2, the cuff guide 33 is formed so that its height from the end face 2a gradually increases from the inner end 33a side toward the outer end 33b. The guide groove 331 is provided over the area in which the tapered face 33c is provided in the cuff guide 33. The groove depth D of the guide groove 331 along the radial direction of the stator core 2 is greater than or equal to the depth of the slot 22 along the radial direction of the stator core 2.

As shown in FIG. 7, the guide groove 331 consists of a cuff support groove 331a, which has a relatively wide groove width along the circumferential direction of the stator core 2, and a coil guide groove 331b, which has a relatively narrow groove width along the circumferential direction of the stator core 2. The cuff support groove 331a and the coil guide groove 331b are formed continuously in the thickness direction of the cuff guide 33 (vertical direction in FIGS. 6 and 7). The cuff support groove 331a is disposed on the side close to the end face 2a of the stator core 2 fixed to the positioning jig 3. The coil guide groove 331b is disposed on the side far from the end face 2a of the stator core 2 fixed to the positioning jig 3.

The cuff support groove 331a is disposed on the side of the bottom face 33d that faces the end face 3a of the positioning jig 3 in the thickness direction of the cuff guide 33. The groove width W1 of the cuff support groove 331a along the circumferential direction of the stator core 2 is substantially equal to the width of the slot 22 along the circumferential direction of the stator core 2. The height H1 of the cuff support groove 331a along the axial direction of the stator core 2 is higher than the protrusion height of the cuff 24a that protrudes from the end face 2a of the stator core 2. The height H1 is constant along the length direction of the guide groove 331. When the cuff guide 33 moves forward toward the slot 22 of the stator core 2, the cuff support groove 331a supports the pair of radial portions 241, 241 of the cuff 24a so as to sandwich the radial portions 241, 241 from both sides in the circumferential direction of the stator core 2 (see FIG. 22).

The coil guide groove 331b is disposed on the side of the tapered face 33c in the thickness direction of the cuff guide 33, and is provided over the entire area between the cuff support groove 331a and the tapered face 33c. The groove width W2 of the coil guide groove 331b along the circumferential direction of the stator core 2 is narrower than the opening width of the slot 22 along the circumferential direction of the stator core 2. Therefore, the coil guide groove 331b is disposed so as to protrude slightly more toward the inside of the slot 22 than the insulating paper 24 mounted in the slot 22. However, the groove width W2 of the coil guide groove 331b is greater than or equal to the width Wc of a straight portion 102 of the strip coil 100 described below to be inserted into the slot 22 (see FIG. 25). Therefore, the coil guide groove 331b does not inhibit the insertion of the straight portion 102 into the slot 22.

The positioning jig 3 of this embodiment includes 36 cuff guides 33 per end face 3a, corresponding to every other slot 22 of the stator core 2. When the cuff guides 33 are moved inward in the radial direction of the positioning jig 3 and positioned in a guide position, the cuff guides 33 are disposed so that the circumferential separation distance between the adjacent cuff guides 33, 33 on the inner end 33a side is equal to the groove width W2 of the coil guide groove 331b of the guide groove 331.

As shown in FIGS. 6 and 7, both sides of the cuff guide 33 on the inner end 33a side have notches 333a, 333a that narrow the overall width of the cuff guide 33 on the bottom face 33d side, along the length direction of the cuff guide 33. The notch 333a has the same constant height H1 as the cuff support groove 331a. As a result, when all the cuff guides 33 move inward in a radial direction to support the corresponding cuffs 24a of the insulating papers 24 so as to sandwich the cuffs 24a (see FIG. 21), the notches 333a, 333a of the cuff guides 33, 33 adjacent to each other in a circumferential direction form a cuff support groove that supports the cuff 24a of the insulating paper 24 in the slot 22 located between the cuff guides 33, 33 to sandwich the cuff 24a from both sides in the circumferential direction of stator core 2, similarly to the cuff support groove 331a. On an side face of the cuff guide 33 on the tapered face 33c side, an overhang 333b overhanging more laterally than the notch 333a is formed. This creates a coil guide groove similar to the coil guide groove 331b, between the overhangs 333b, 333b of the adjacent cuff guides 33, 33.

As shown in FIG. 5, both end faces 3a, 3a of the positioning jig 3 include a pair of inner diameter side regulating pin 34a and outer diameter side regulating pin 34b, corresponding to a cuff guide 33. The cuff guide 33 is attached to the both end faces 3a, 3a of the positioning jig 3 by way of the pair of inner diameter side regulating pin 34a and outer diameter side regulating pin 34b which engage with the inside of the long hole 332 of the cuff guide 33.

When the cuff guide 33 moves outward in the radial direction of the positioning jig 3, the inner diameter side regulating pin 34a contacts an inner end 332a of the long hole 332, thereby positioning the cuff guide 33 in the most radially outward non-guided position, as shown in FIG. 2. In the non-guided position, the inner end 33a of the cuff guide 33 is placed outside the stator core insertion hole 31 in a radial direction.

When the cuff guide 33 moves inward in the radial direction of the positioning jig 3, the outer diameter side regulating pin 34b contacts an outer end 332b of the long hole 332, thereby positioning the cuff guide 33 in the most radially inward guided position. At this time, the inner end 33a of the cuff guide 33 is placed outside the coil winding jig 4 in a radial direction (see FIGS. 20 and 21).

The stator core 2 is inserted into the stator core insertion hole 31 of the positioning jig 3 from either side in the axial direction. As shown in FIG. 5, in the cuff guide 33 placed on the opposite side of the insertion side of the stator core 2, the inner end 33a side may be placed to interfere with the circular portion 21 of the stator core 2 with the outer diameter side regulating pin 34b contacting the inner end 332a. However, the inner diameter side regulating pin 34a and the outer diameter side regulating pin 34b may be configured to be selectively projected or retracted from the surface of the positioning jig 3 by means of a projecting and retracting mechanism with an actuator such as a cylinder (not shown) provided inside the positioning jig 3. Thus, when the cuff guide 33 is positioned as shown in FIG. 5, the cuff guide 33 can be moved further outward in a radial direction as necessary by retracting the inner diameter side regulating pin 34a and the outer diameter side regulating pin 34b from the surface of the positioning jig 3, and as shown in FIG. 2, the cuff guide 33 can be completely retracted from the circular portion 21 of the stator core 2.

As shown in FIG. 3, the coil winding jig 4 includes a substantially cylindrical jig body 41, a plurality of comb teeth 42 radially protruding from the outer periphery of the jig body 41, a plurality of comb-toothed grooves 43 formed between adjacent comb teeth 42 in the circumferential direction, and a shaft hole 44 that opens in the center of the jig body 41.

The comb teeth 42 and comb-toothed grooves 43 are provided at both ends of the jig body 41 in an axial direction. The phases of the comb teeth 42 and the comb-toothed grooves 43 at both ends of the jig body 41 are aligned in the axial direction. The number of the comb-toothed grooves 43 arranged in the circumferential direction of the jig body 41 matches the number of the slots 22 provided in the stator core 2.

Therefore, the coil winding jig 4 of this embodiment includes 72 comb-toothed grooves 43. The coil winding jig 4 is formed so that the outer diameter of the coil winding jig 4 defined by the position of the tip of the comb teeth 42 is smaller than the inner diameter of the stator core 2, so that the coil winding jig 4 can be inserted inside the circular portion 21 of the stator core 2.

Figure 9:
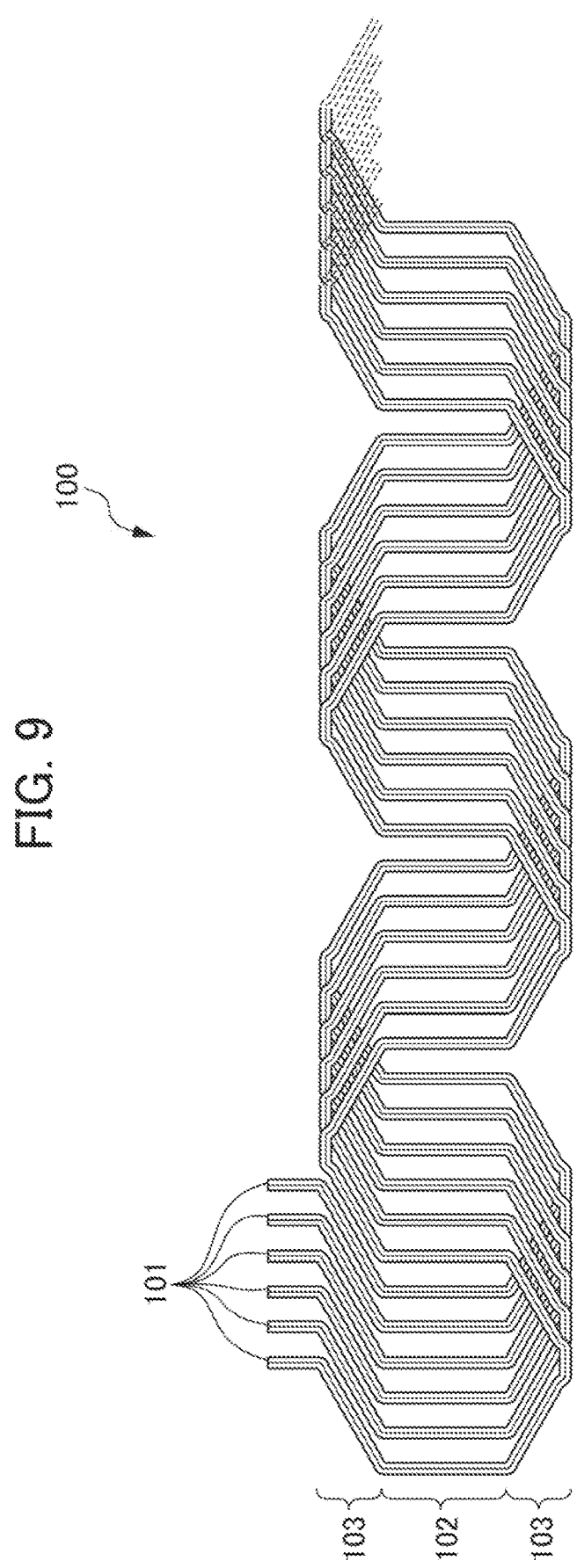
FIG. 9 is an elevation view of a strip coil.

On the coil winding jig 4, the strip coil 100 to be mounted to the stator core 2 is wound in a circular shape. As shown in FIG. 9, the strip coil 100 is a long strip coil formed of flat square conductors 101 with substantially rectangular sections. The flat square conductor 101 is made of a highly conductive metal, such as copper or aluminum.

The strip coil 100 has a plurality of straight portions 102 and a plurality of coil ends 103. The straight portions 102 are inserted into the slots 22 of the stator core 2, and each extend substantially linearly and are arranged in parallel at regular intervals. The coil ends 103 are located closer to the side ends of the strip coil 100 than the straight portions 102, and alternately connect one ends of adjacent straight portions 102 and the other ends of adjacent straight portions 102 in a substantially triangular mountain shape. The coil ends 103 are respectively arranged to protrude from the slots 22 in the axial direction of the stator core 2 when the strip coil 100 is mounted in the slots 22 of the stator core 2. The strip coil 100 of this embodiment is formed in a long strip shape by bundling six flat square conductors 101, each of which has a plurality of straight portions 102 and a plurality of coil ends 103 bent so that the straight portions 102 are arranged in parallel at regular intervals.

Figure 10:
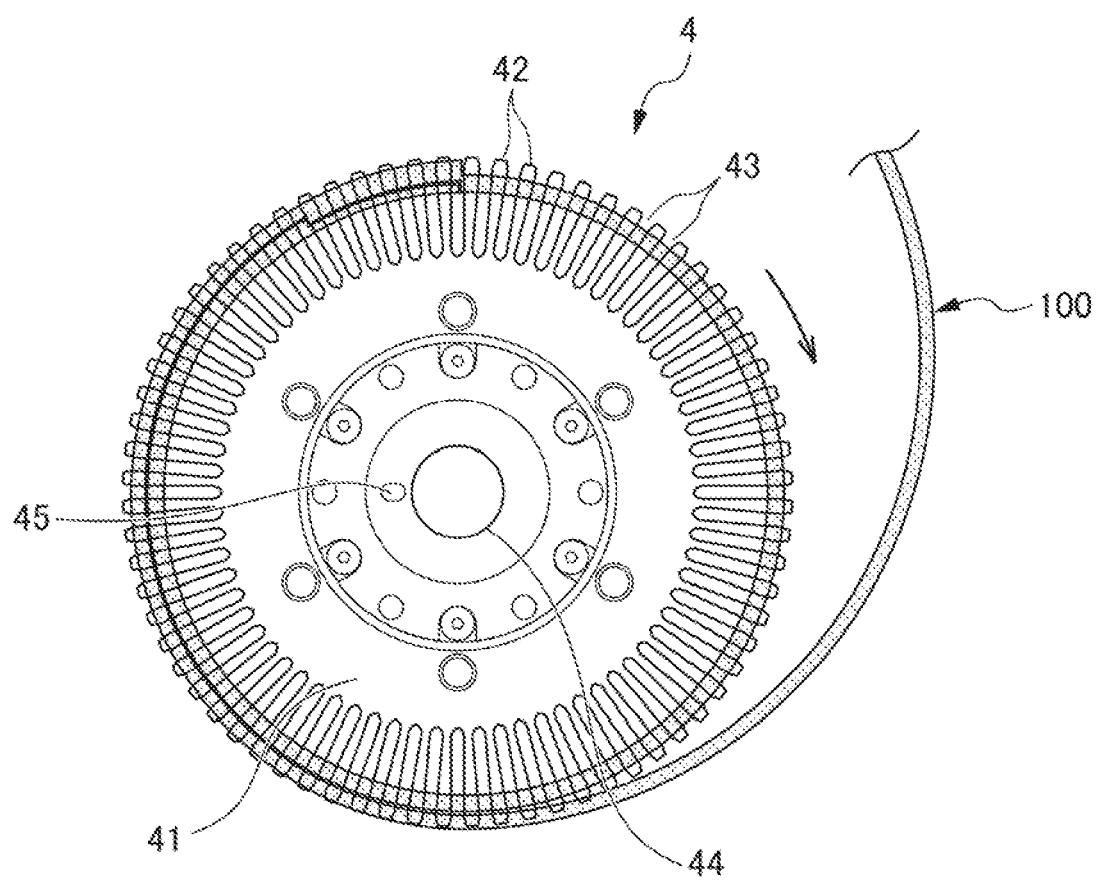
FIG. 10 is a plan view showing winding the strip coil on the coil winding jig.
Figure 11:
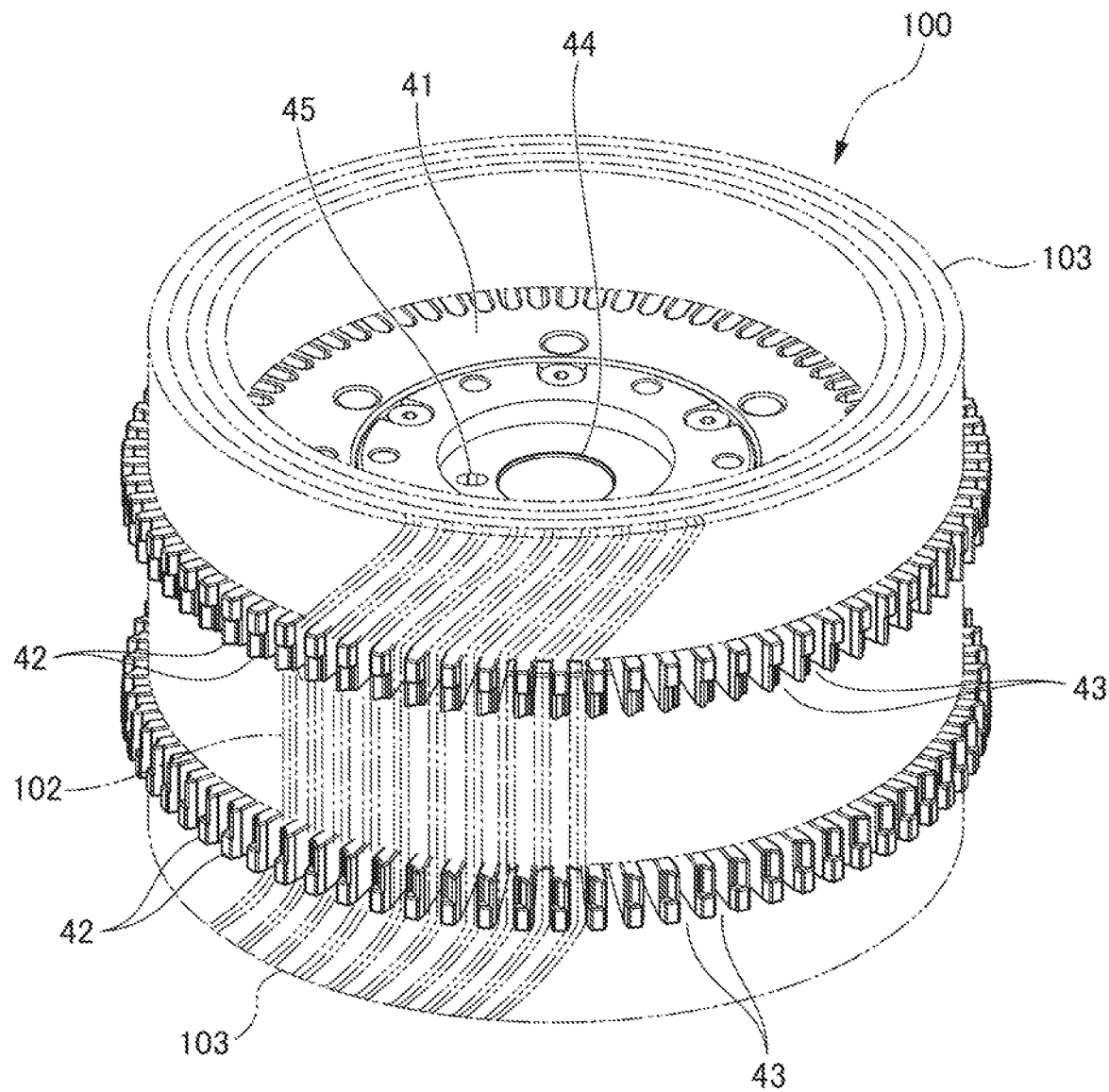
FIG. 11 is a perspective view of the coil winding jig with the strip coil wound thereon.

As shown in FIG. 10, the coil winding jig 4 is used to wind the strip coil 100 in multiple layers by sequentially inserting the straight portions 102 of the strip coil 100 from the outside of the comb-toothed grooves 43, before the coil winding jig 4 is inserted inside the stator core 2. Thus, as shown in FIG. 11, the coil winding jig 4 with the strip coil 100 wound in a circular shape is configured (coil winding step).

The distance between the comb teeth 42 of the jig body 41 in the axial direction corresponds to the length of the straight portion 102 of the strip coil 100. Therefore, the straight portion 102 of the strip coil 100 wound on the coil winding jig 4 is housed over the comb-toothed grooves 43, 43 of the same phase at both ends of the jig body 41. The coil ends 103 of the strip coil 100 wound in multiple layers respectively protrude cylindrically from the comb-toothed grooves 43, in the axial direction of the jig body 41. As shown in FIGS. 1 to 3, the coil winding jig 4, on which the strip coil 100 has been wound in a circular shape in this manner, is inserted into the through-hole 20 of the stator core 2 fixed to the positioning jig 3, for example, by the operation of a robot (not shown). It should be noted that the strip coil 100 on the coil winding jig 4 is not shown in FIG. 1.

The coil winding jig 4 inserted into the through-hole 20 inside the stator core 2 is held in a predetermined position and posture by the coil expansion devices 5, which are respectively placed on both sides of the positioning jig 3 with the positioning jig 3 provided therebetween. As shown in FIG. 1, the coil expansion device 5 of this embodiment has a substantially cylindrical external shape and faces the coil winding jig 4 inserted inside the stator core 2 in the axial direction.

Figure 12:
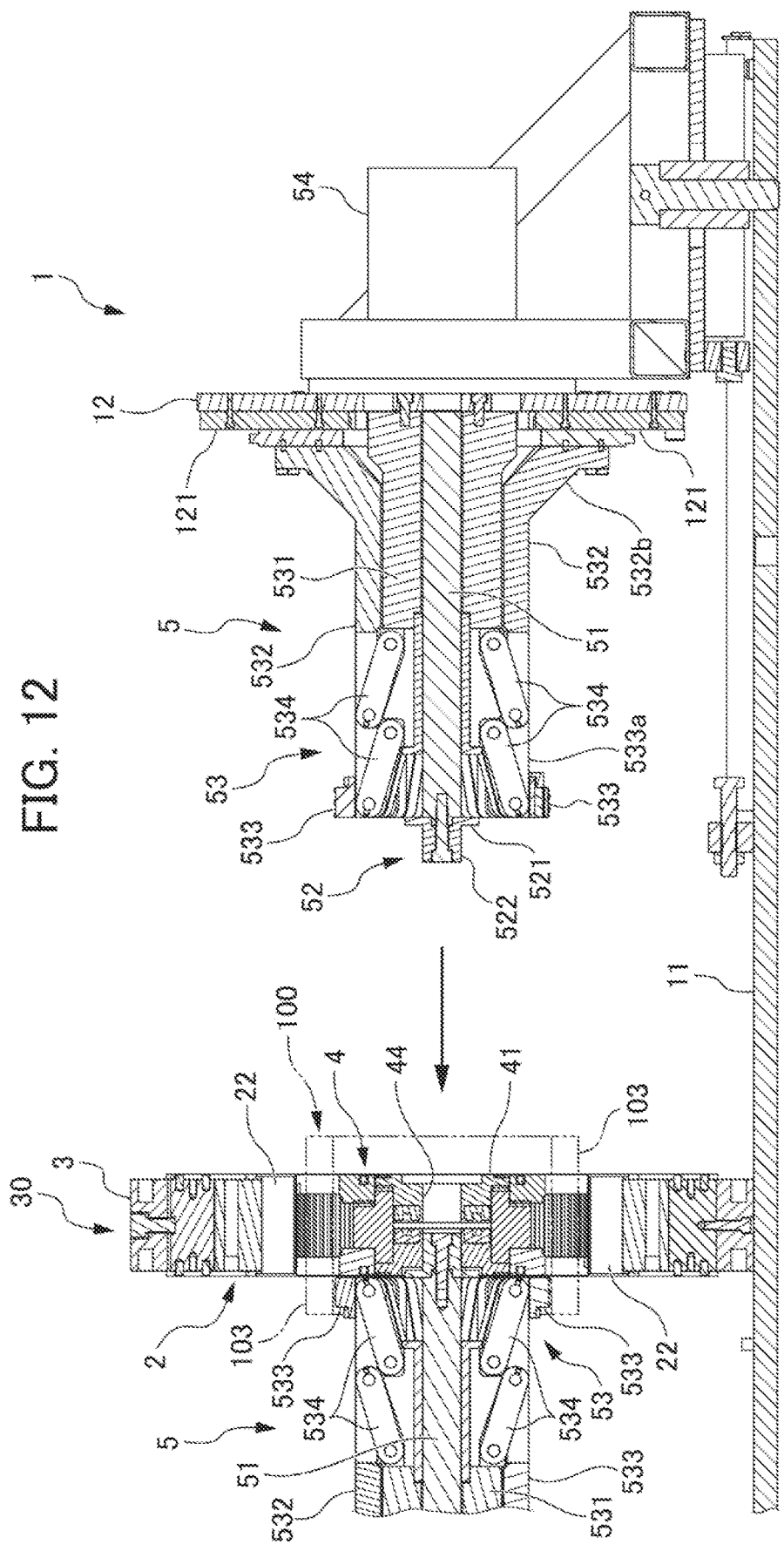
FIG. 12 is a side sectional view showing a coil expansion device being attached to the coil winding jig inserted inside the stator core.

As shown in FIGS. 1 and 12, the coil mounting apparatus 1 include a pair of support substrates 12, 12 standing on the base 11 that fixes the positioning jig 3, so that they face each other with the positioning jig 3 disposed therebetween. The coil expansion devices 5 each protrude horizontally from the corresponding support substrate 12 to the coil winding jig 4, which is inserted inside the stator core 2. The coil expansion devices 5 can be each moved in the directions of contacting and separating from the coil winding jig 4 by moving the support substrate 12 linearly on the base 11 by driving a motor or the like (not shown).

Figure 13:
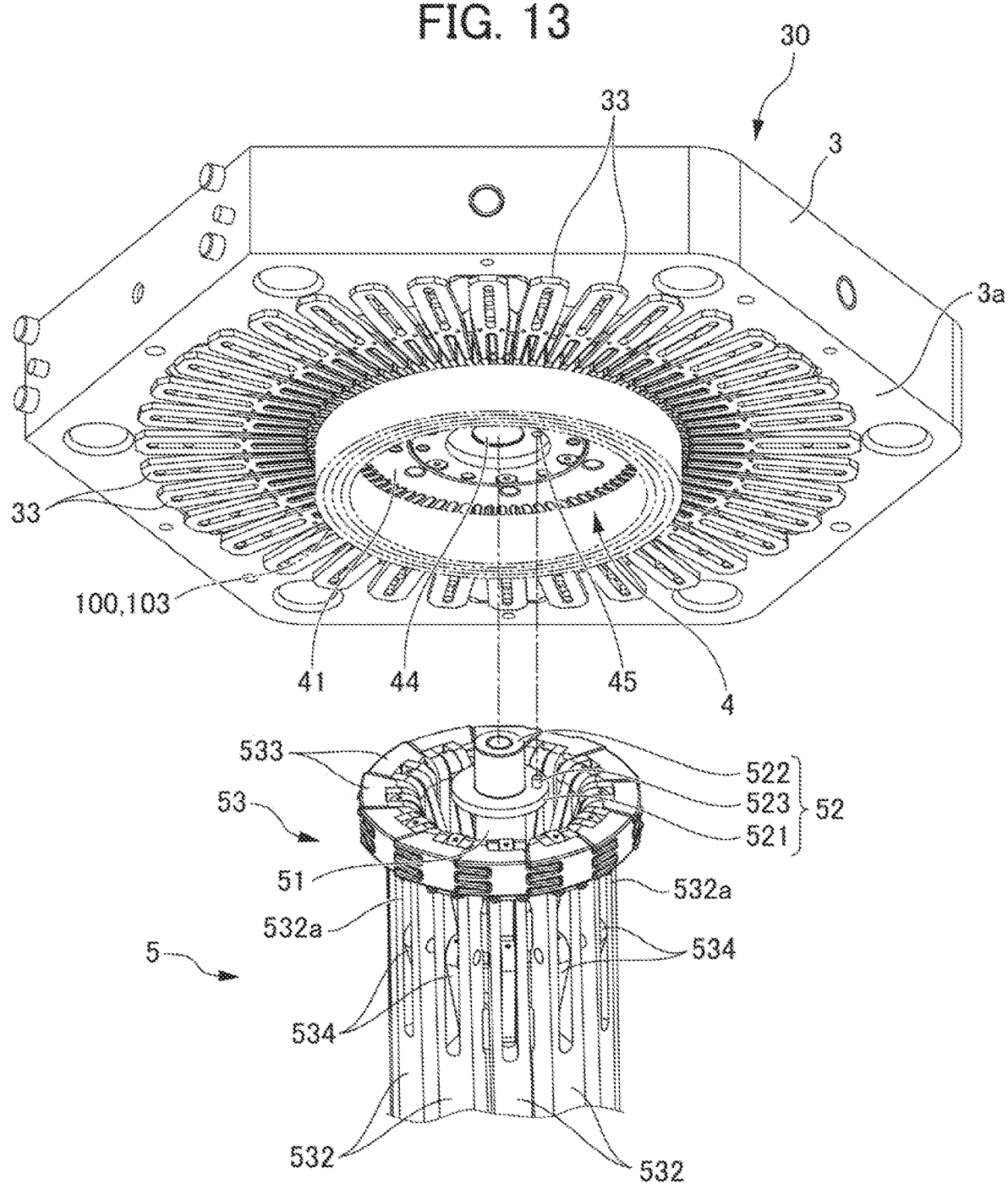
FIG. 13 is a perspective view of the coil winding jig inserted inside the stator core and a holding portion of the coil expansion mechanism.

As shown in FIGS. 12 and 13, the coil expansion device 5 includes a main shaft 51 extending from the support substrate 12 to the coil winding jig 4 inserted inside the stator core 2 at its center. At the leading end of the main shaft 51, a holding portion 52 is provided to hold the coil winding jig 4 in a predetermined position and posture inside the stator core 2. The holding portion 52 includes a shaft protrusion 522 protruding from the center of a circular end plate 521 disposed at the leading end of the main shaft 51, and a positioning protrusion 523 disposed outside the shaft protrusion 522 in a radial direction and protruding from the end plate 521 in the same direction as the shaft protrusion 522. The shaft protrusion 522 fits into the shaft hole 44 of the coil winding jig 4. The positioning protrusion 523 fits into a positioning hole 45, which is provided outside the shaft hole 44 of the coil winding jig 4 in a radial direction.

The positioning hole 45 of the coil winding jig 4 and the positioning protrusion 523 of the holding portion 52 are pre-positioned so that the phase of the slots 22 of the stator core 2 to be fixed to the positioning jig 3 matches the phase of the comb-toothed grooves 43 of the coil winding jig 4 inserted inside the stator core 2 when they are fitted to each other. Therefore, as shown in FIG. 5, when the coil expansion device 5 moves toward the positioning jig 3, and the shaft hole 44 and the positioning hole 45 of the coil winding jig 4 fit to the shaft protrusion 522 and the positioning protrusion 523 of the holding portion 52, the coil winding jig 4 is held with the phase of the comb-toothed grooves 43 aligned with that of the slots 22 of the stator core 2. As a result, the inside of the slot 22 of the stator core 2 and the inside of the comb-toothed groove 43 of the coil winding jig 4 communicate with each other in a radial direction.

The coil expansion device 5 includes a coil expansion portion 53 on the outer peripheral side of the main shaft 51. The coil expansion portion 53 includes a movable cylinder 531, which is fitted, disposed on the outer peripheral side of the main shaft 51, a plurality of movable arms 532 disposed on the outer peripheral side of the movable cylinder 531, and a plurality of piece members 533 respectively provided at the tips of the movable arms 532.

The movable cylinder 531 has a length shorter than the length of the main shaft 51 and is slidable along the axial direction of the main shaft 51 by driving an actuator 54 such as a cylinder, which is disposed behind the support substrate 12.

The movable arms 532 extend along the axial direction of the main shaft 51 and are arranged at regular intervals in a circumferential direction on the outer peripheral side of the movable cylinder 531. The coil expansion portion 53 of this embodiment includes 12 movable arms 532 arranged along the circumferential direction of the main shaft 51. The surface of the support substrate 12 is provided with 12 guide rails 121 arranged pointing outward in a radial direction with the main shaft 51 at the center. Rear ends 532b of the movable arms 532 are respectively mounted to be able to move along the guide rails 121. The movable arm 532 bends from the guide rail 121 along the axial direction of the movable cylinder 531 and extends to the vicinity of the outer periphery of the holding portion 52. The tips 532a of the movable arms 532 are each connected to an outer periphery on the side of the leading end of the movable cylinder 531 via two links 534 rotatably attached.

Figure 15:
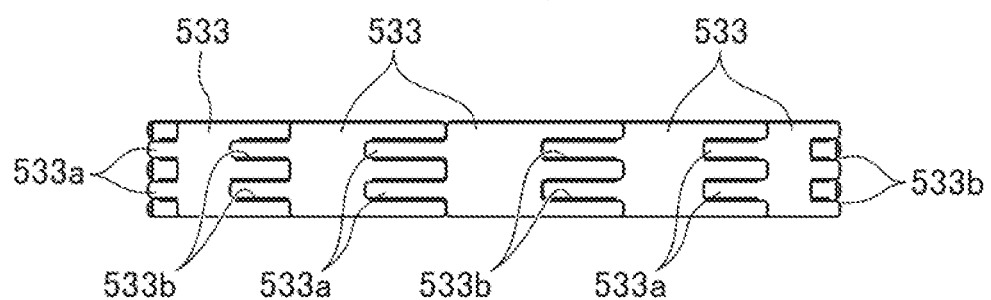
FIG. 15 is a side view of a coil expansion portion of the coil expansion mechanism reduced in diameter.
Figure 16:
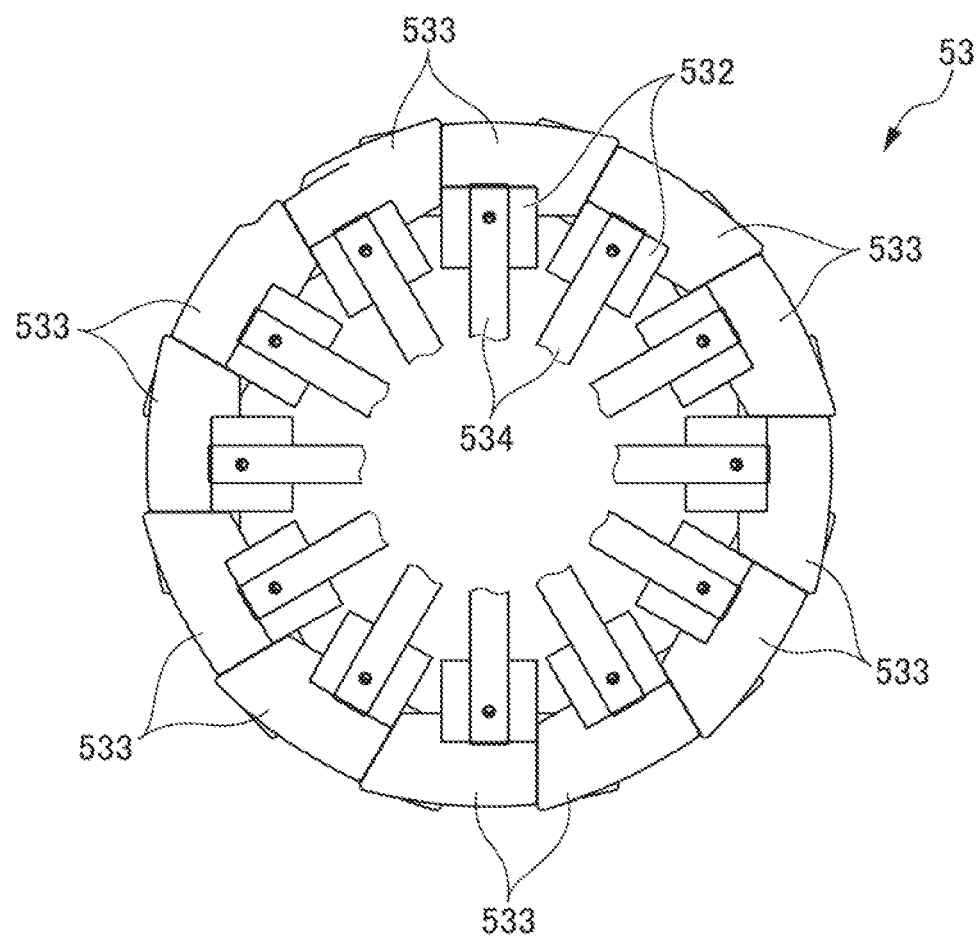
FIG. 16 is an elevation view of the coil expansion mechanism reduced in diameter.

The piece members 533 have a substantially fan shape and are respectively provided at the tips of the movable arms 532. Therefore, the coil expansion portion 53 of this embodiment includes 12 piece members 533. As shown in FIGS. 15 and 16, the piece members 533 each has a pair of engagement protrusions 533a at one end in a circumferential direction and a pair of engagement grooves 533b that engage with a pair of engagement protrusions 533a at the other end in the circumferential direction. The pair of engagement protrusions 533a are adjacent in the axial direction of the coil expansion portion 53, and protrudes in parallel toward the circumferential direction of the coil expansion portion 533. Twelve piece members 533 are arranged in a circular pattern on the outer peripheral side of the holding portion 52 by engaging the pair of engagement protrusions 533a and the pair of engagement grooves 533b of adjacent piece members 533, 533 in a circumferential direction.

Figure 14:
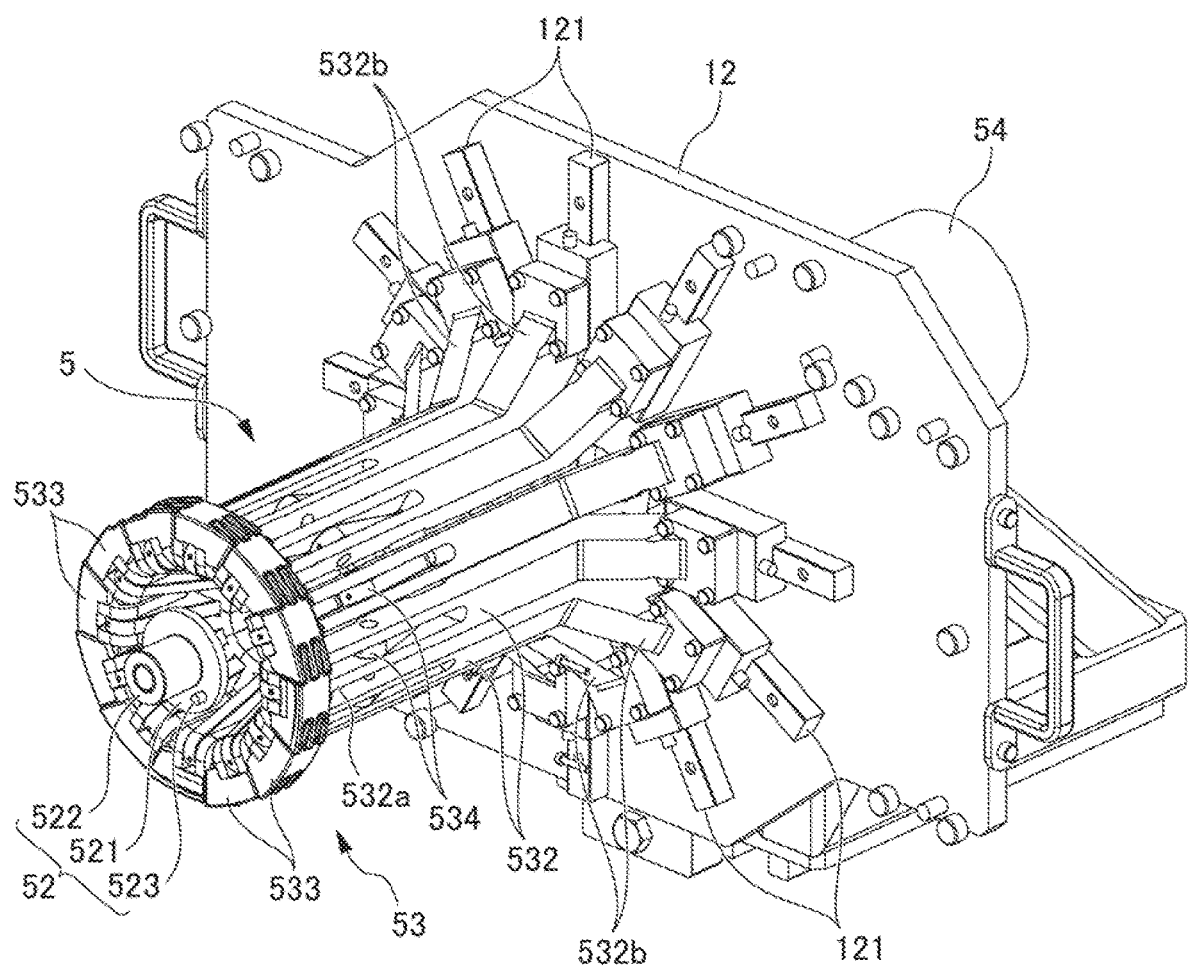
FIG. 14 is a perspective view of the coil expansion mechanism reduced in diameter.

In the coil expansion portion 53 of the coil expansion device 5 in FIGS. 12 to 14, the movable cylinder 531 is retracted to the rear end side (support substrate 12 side) of the main shaft 51. At this time, the movable arms 532 each move to the inner end side of the guide rail 121 radially arranged, and are positioned to be closest to the outer periphery of the movable cylinder 531. As shown in FIGS. 15 and 16, this causes the coil expansion portion 53 to be at its smallest diameter so as to bring the 12 piece members 533 into close contact with one another. The outer diameter of the coil expansion portion 53 when the coil expansion portion 53 is at its smallest diameter is slightly smaller than the inner diameter of the coil ends 103, which protrude cylindrically in an axial direction from the coil winding jig 4 on which the strip coil 100 is wound. The coil expansion device 5 is inserted into the coil ends 103, which protrude cylindrically in the axial direction of the coil winding jig 4, with the coil expansion portion 53 reduced in diameter. The holding portion 52 holds the coil winding jig 4.

Figure 17:
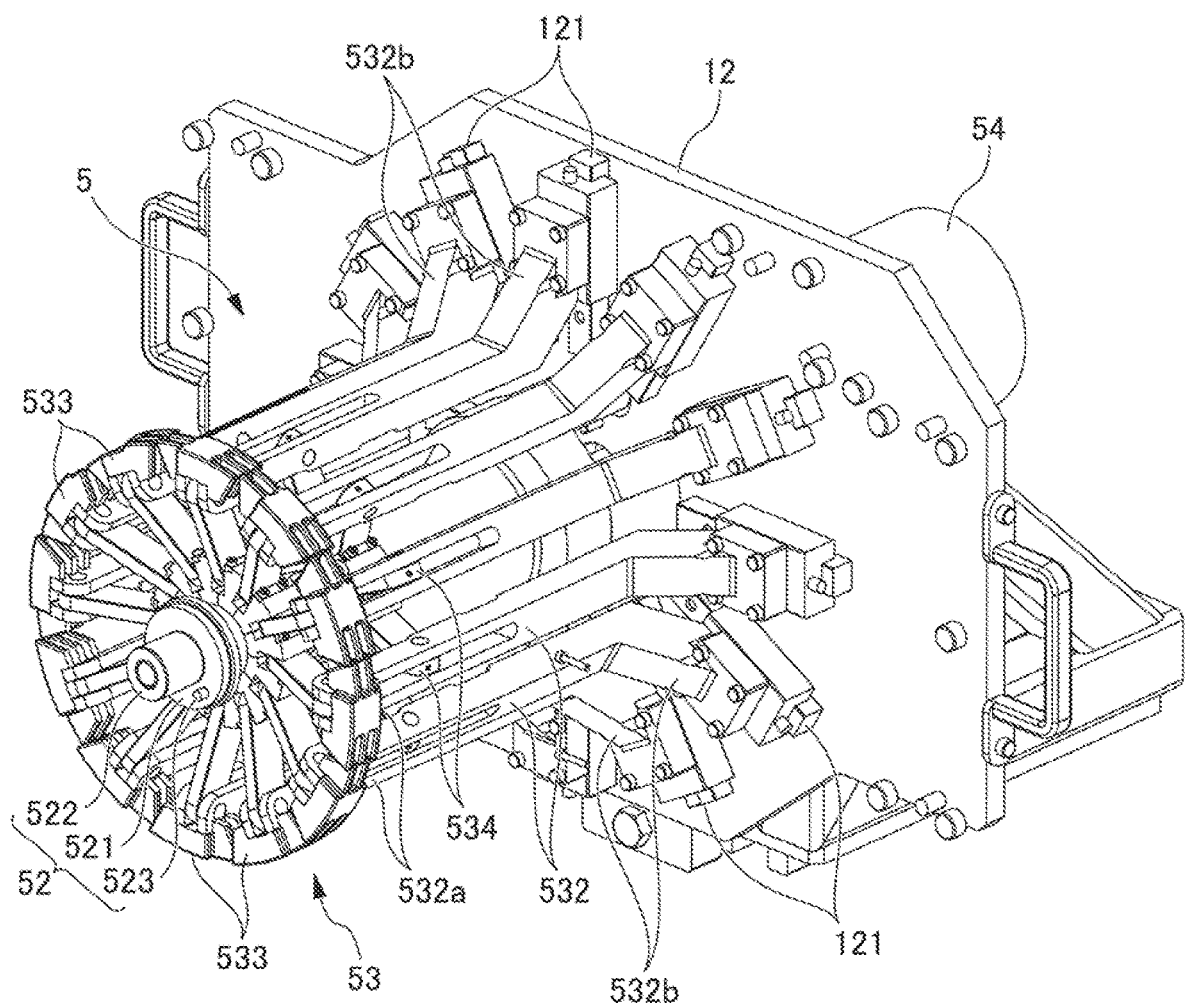
FIG. 17 is a perspective view of the coil expansion mechanism increased in diameter.
Figure 18:
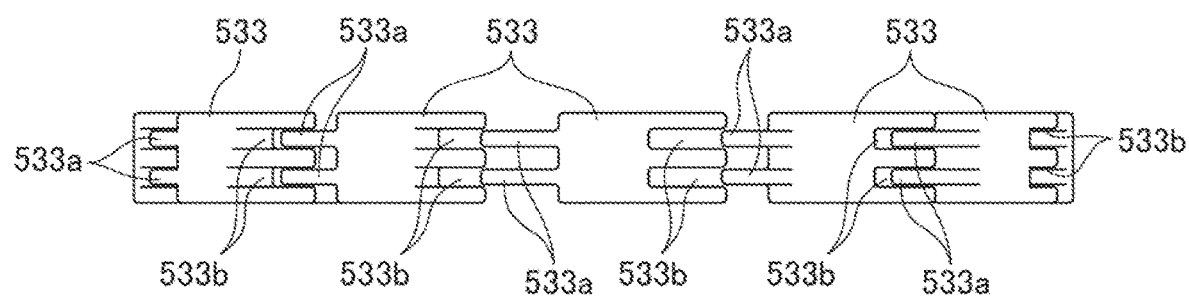
FIG. 18 is a side view of the coil expansion portion of the coil expansion mechanism increased in diameter.
Figure 19:
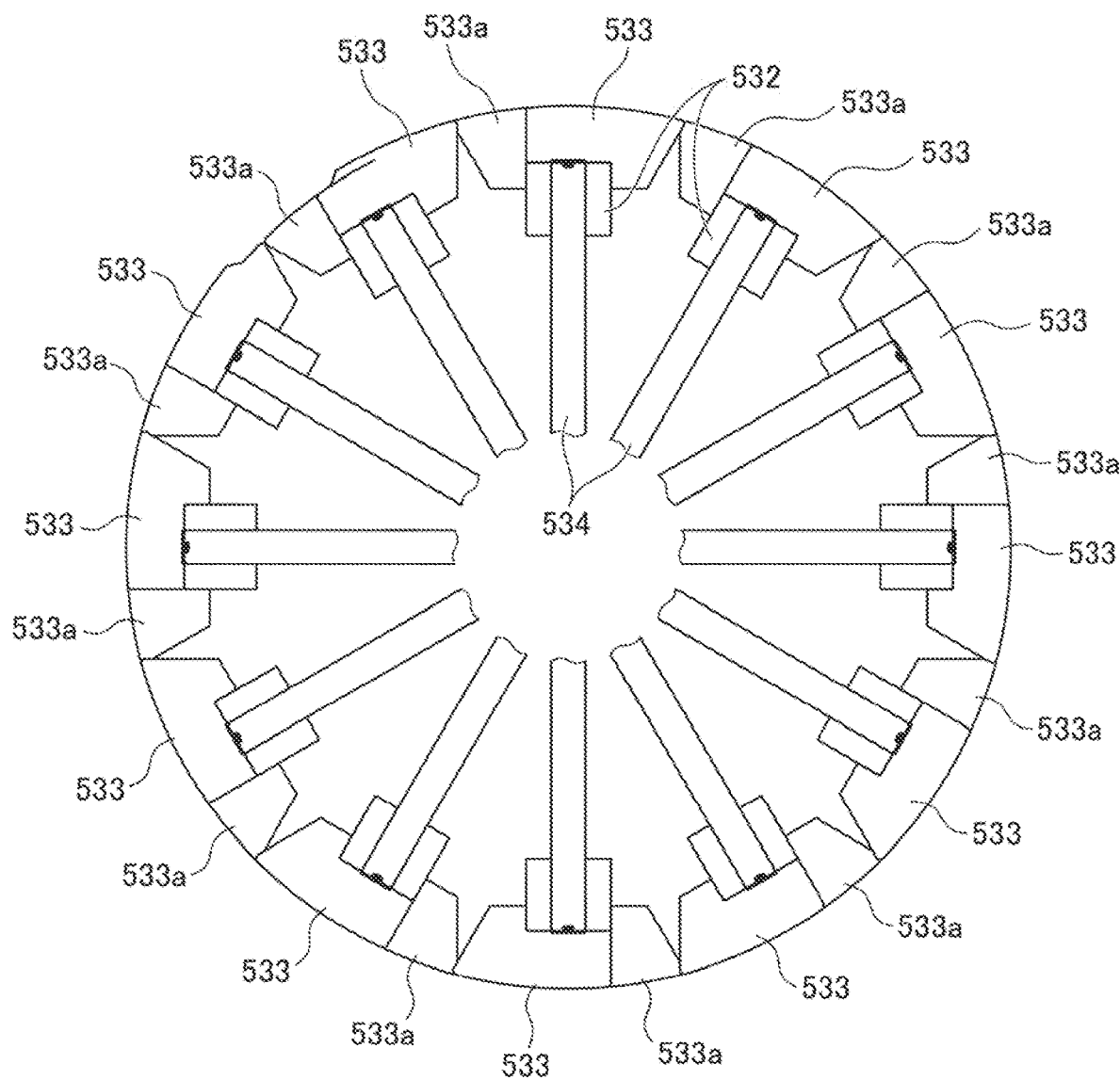
FIG. 19 is an elevation view of the coil expansion portion of the coil expansion mechanism increased in diameter.

When the movable cylinder 531 moves forward along the main shaft 51 toward the coil winding jig 4 by driving the actuator 54, the links 534 connected to the movable cylinder 531 respectively rotate so as to project outward in the radial direction of the movable cylinder 531, and move the movable arms 532 outward in parallel along the guide rails. This causes the 12 movable arms 532 to be separated from the movable cylinder 531 outward in a radial direction. As shown in FIGS. 17 to 19, at this time, the coil expansion portion 53 increases in diameter by moving the piece members 533 so as to increase the distance between each of the adjacent piece members 533. The outer diameter of the coil expansion portion 53 when the coil expansion portion 53 is at its largest diameter is slightly larger than the outer diameter of the coil winding jig 4.

As shown in FIGS. 18 and 19, when the coil expansion portion 53 is at its largest diameter, the adjacent piece members 533, 533 are separated from one another. Between the piece members 533, 533, a pair of engagement protrusions 533a separated from the engagement grooves 533b protrude in a circumferential direction. Therefore, when the coil expansion portion 53 is viewed in a circumferential direction, the adjacent piece members 533, 533 are connected by the pair of engagement protrusions 533a, 533a and no grooves are formed that penetrate the coil expansion portion 53 in a radial direction.

A coil insertion guide method that guides the strip coil 100 wound on the coil winding jig 4 when the coil is inserted into the slots 22 from the inside of the stator core 2 fixed to the positioning jig 3 in the coil mounting apparatus 1 will be described.

Figure 20:
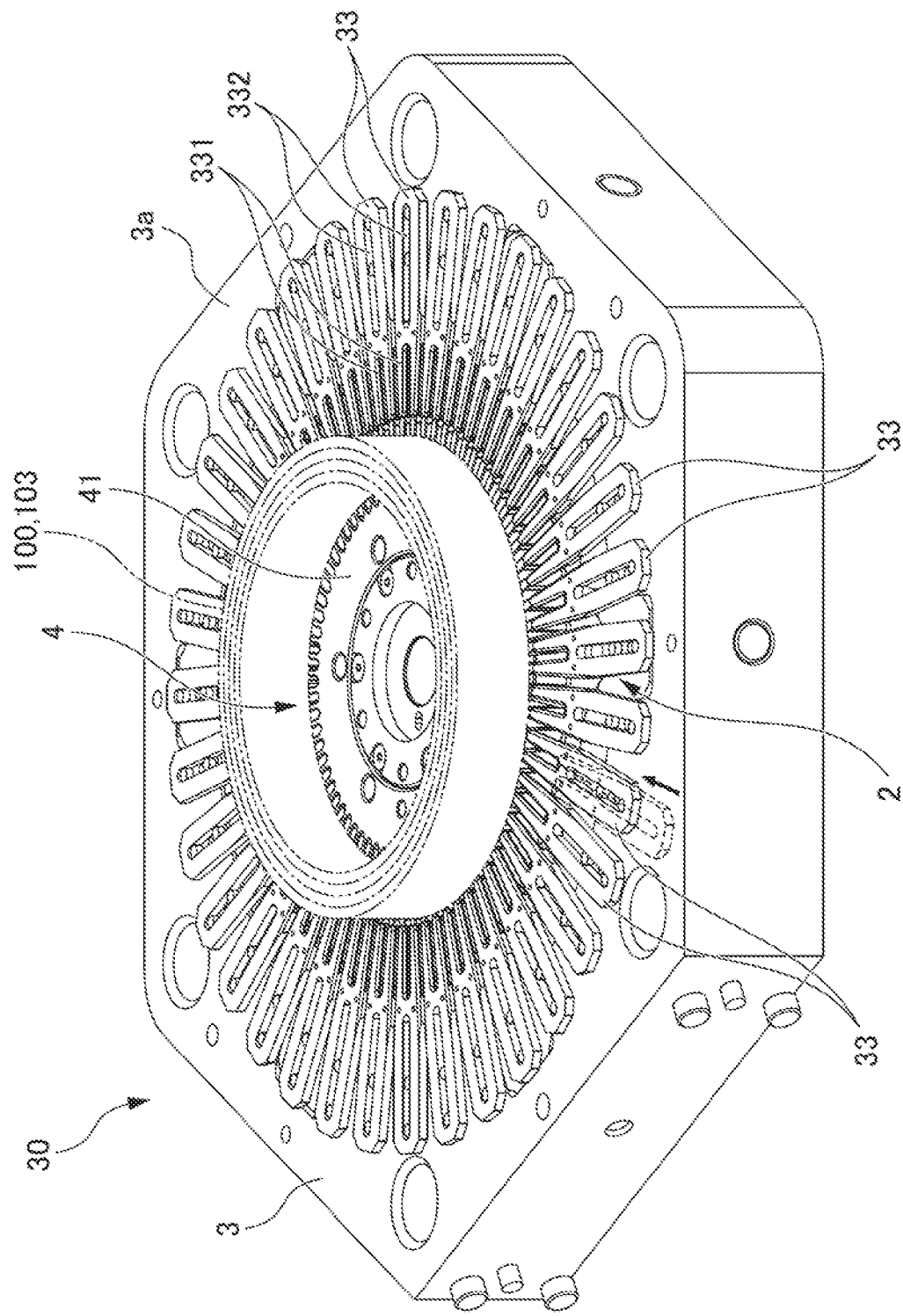
FIG. 20 is a perspective view showing a state in which insulating members in the slots of the stator core are supported by guide members.

As described above, the strip coil 100 is wound on the coil winding jig 4 in a circular shape in the coil winding step before the coil winding jig 4 is inserted inside the stator core 2. As shown in FIG. 20, after the coil winding jig 4, on which the strip coil 100 is wound in a circular shape, is inserted inside the stator core 2 fixed to the positioning jig 3, the cuff guides 33 are moved inward in a radial direction by the drive of an actuator (not shown).

Figure 21:
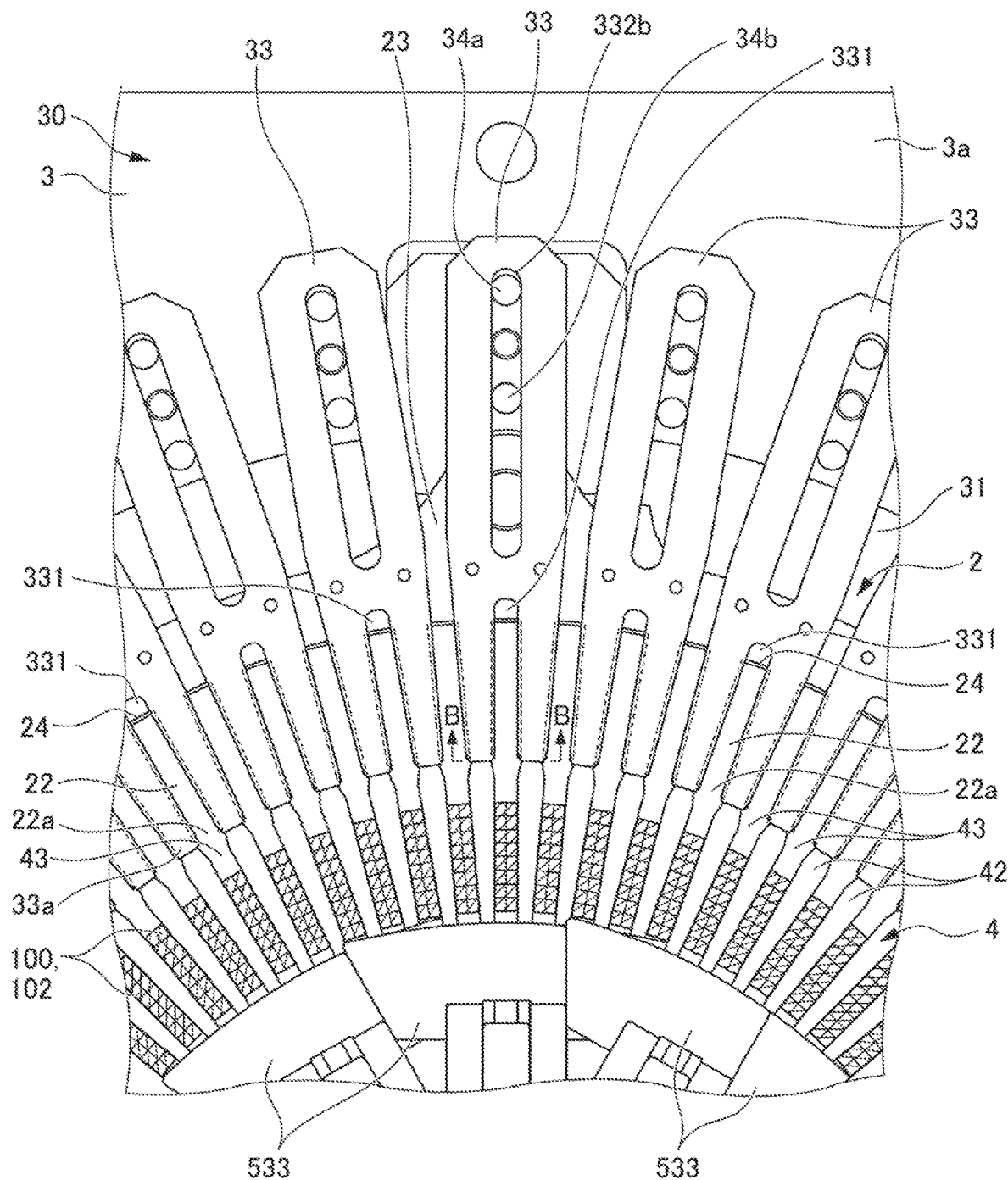
FIG. 21 is an enlarged partial view showing a state in which the insulating members in the slots of the stator core are supported by cuff guides.
Figure 22:
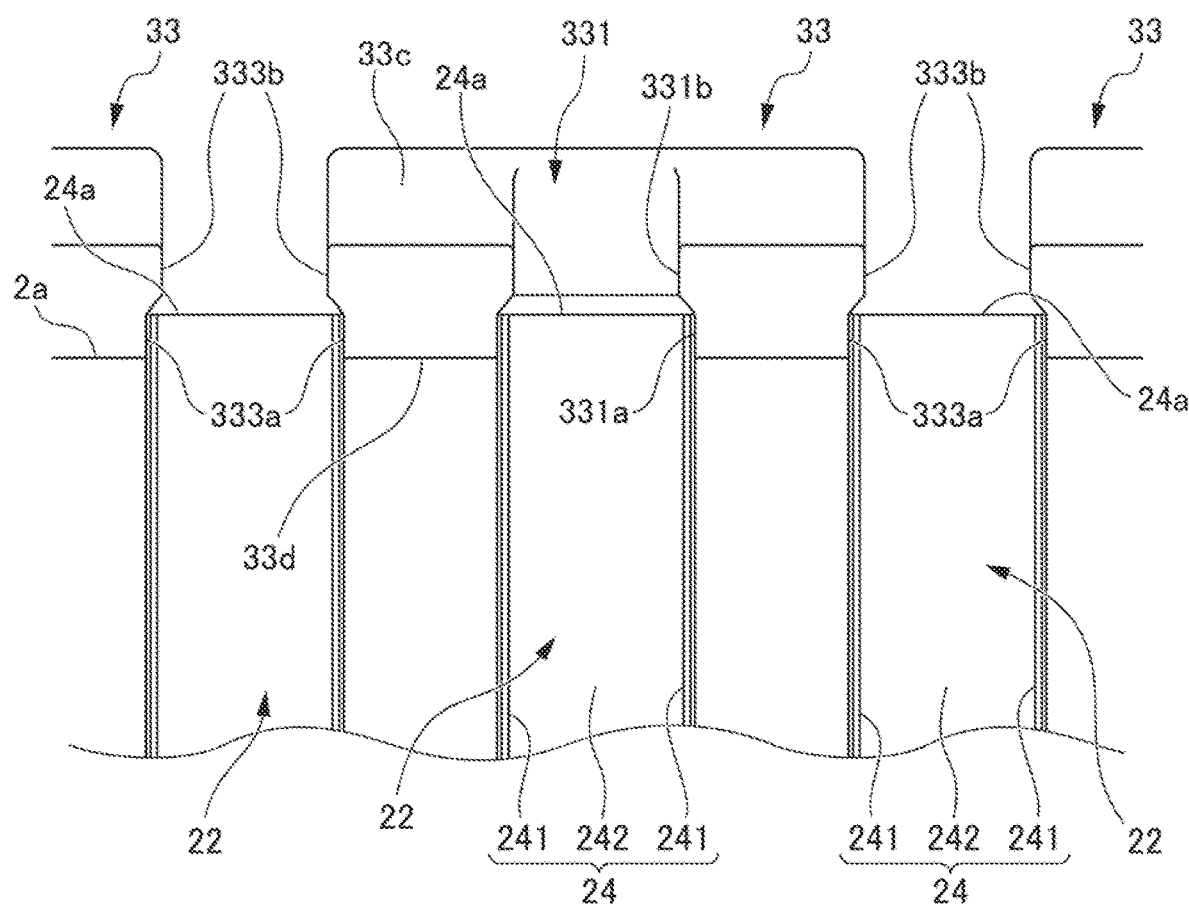
FIG. 22 shows the stator core as seen along line B-B in FIG. 21.

As shown in FIG. 21, when the cuff guides 33 move inward in a radial direction, the guide grooves 331 of the cuff guides 33 support the cuffs 24a of the insulating papers 24 in the corresponding slots 22 so as to sandwich the cuffs 24a from both sides in a circumferential direction. Specifically, as shown in FIG. 22, the cuff support groove 331a of the guide groove 331 supports a pair of radial portions 241, 241 of the cuff 24a so as to sandwich the radial portions 241, 241. The coil guide groove 331b of the guide groove 331 is disposed outside the cuff 24a in the axial direction of the stator core 2 so as to hide the cuff 24a (upper side on the paper surface in FIG. 22).

At this time, between the adjacent cuff guides 33, 33 in a circumferential direction, the cuff 24a of the insulating paper 24 of the slot 22 between the cuff guides 33, 33 is supported by a cuff support groove formed by the notches 333a of the cuff guide 33 to be sandwiched from both sides in a circumferential direction. The overhangs 333b, 333b of the cuff guides 33, 33, are disposed so as to hide the cuff 24a. Thus, all the cuffs 24a of the insulating papers 24 in the slots 22 are each supported by the cuff support groove 331a or the notch 333a of the cuff guide 33, and thereby all the insulating papers 24 are positioned in a predetermined position of the slots 22.

In FIG. 20, the coil expansion device 5 that holds the coil winding jig 4 is not shown. However, the support operation of the cuffs 24a by the cuff guides 33 is performed at an appropriate timing after the stator core 2 is fixed to the positioning jig 3 and before the strip coil 100 is inserted into the slots 22 of the stator core 2 by the operation of the coil expansion portion 53 described below.

The coil winding jig 4 inserted inside the stator core 2 is held by the holding portions 52 of the coil expansion devices 5 by moving the coil expansion devices 5 with the coil expansion portions 53 reduced in diameter toward the coil winding jig 4 (coil winding jig holding step).

Figure 23:
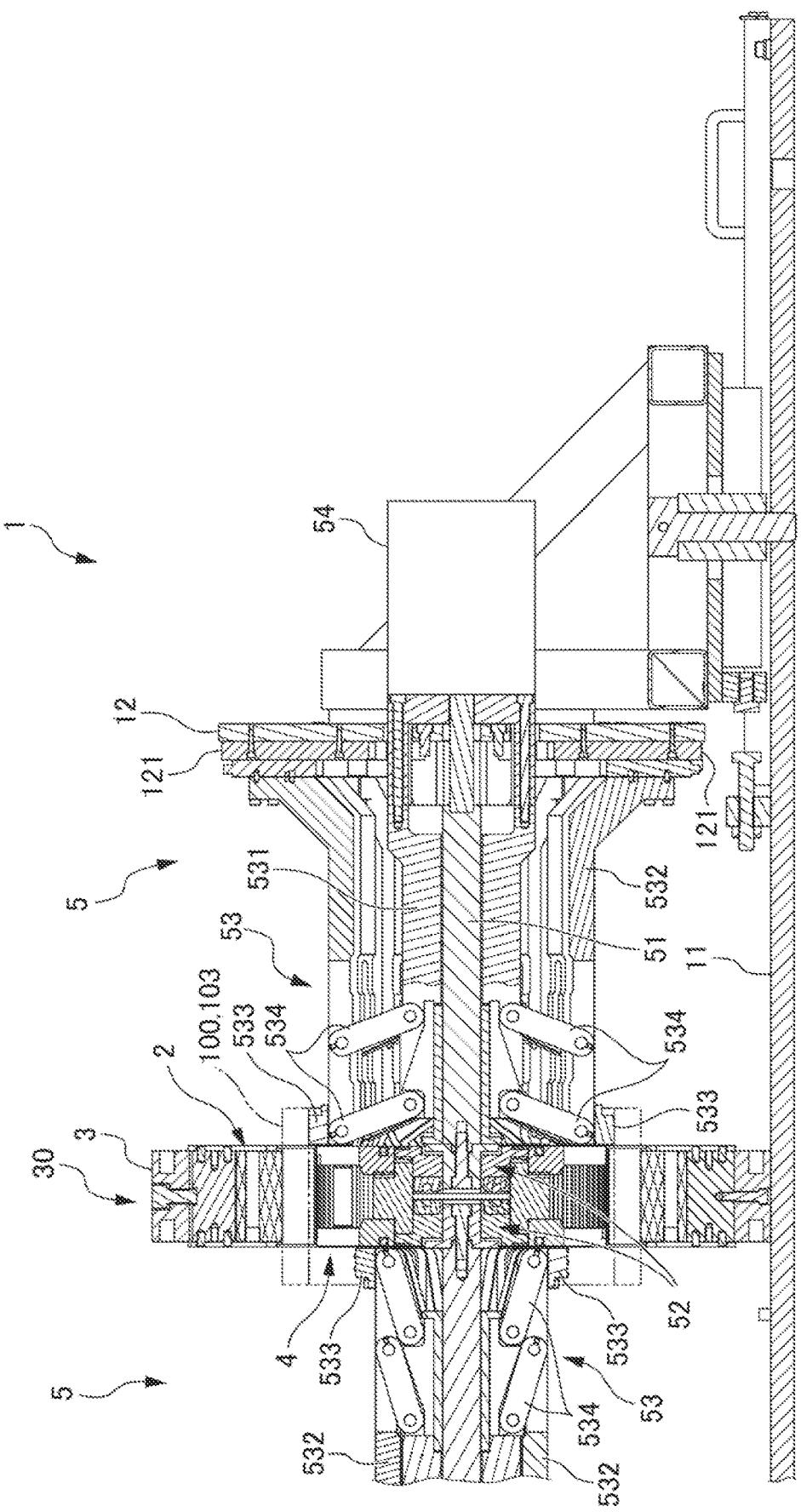
FIG. 23 is a side sectional view showing that the coil expansion mechanism expands the strip coil on the coil winding jig fixed to the coil insertion guide device.
Figure 24:
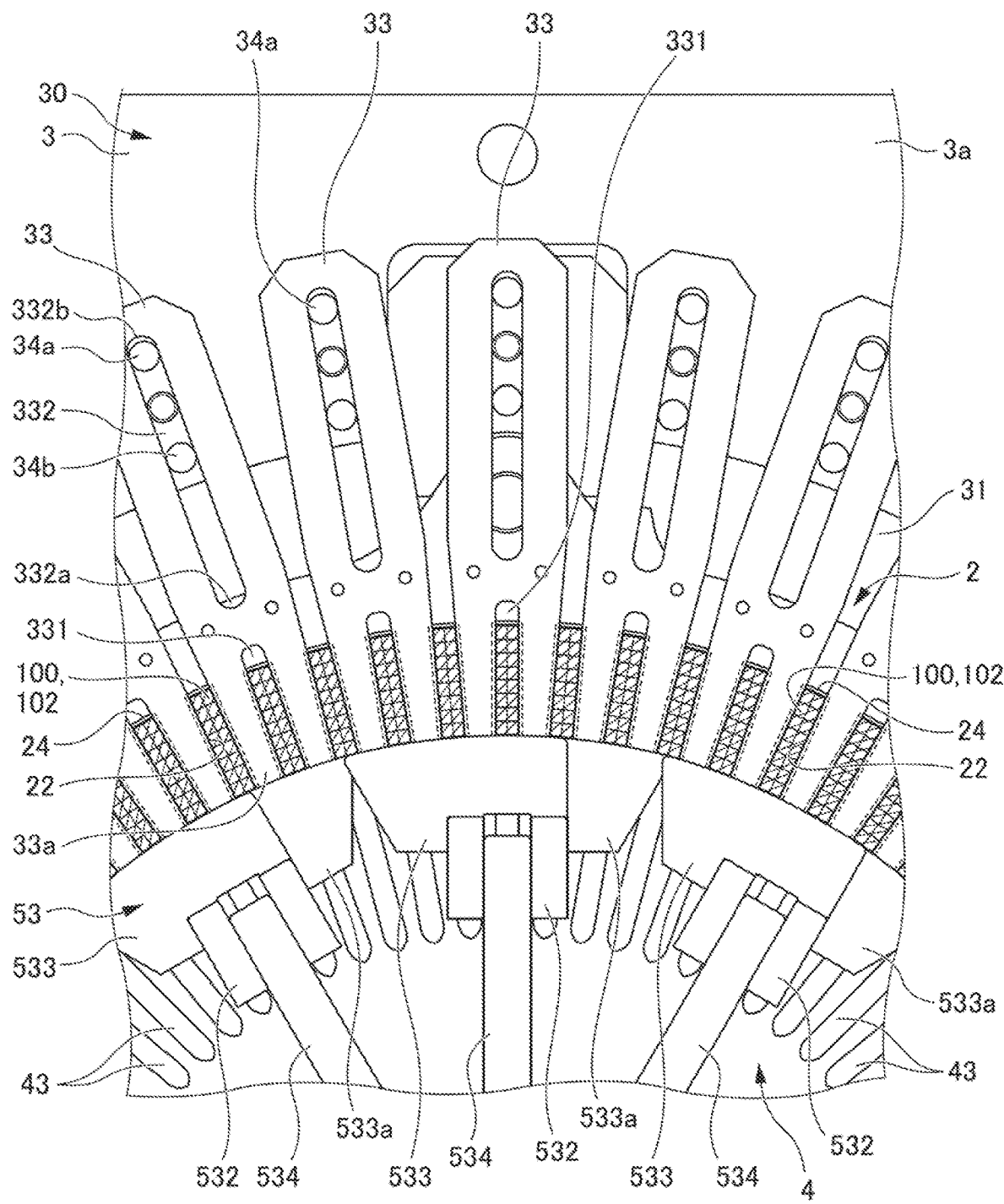
FIG. 24 is an enlarged partial view of a state in which the strip coil, which is pressed by the coil expansion mechanism, is inserted into the slots of the stator core.

As shown in FIGS. 23 and 24, after the cuffs 24a of the insulating papers 24 in the slots 22 are positioned by the cuff support grooves 331a of the guide grooves 331 of the cuff guides 33, the coil expansion portions 53 of the coil expansion devices 5 increase in diameter by driving the actuator 54. As a result, the coil expansion portion 53 presses the coil ends 103 of the strip coil 100 wound on the coil winding jig 4 from the inside toward the outside of the strip coil 100. The strip coil 100 pressed by the coil expansion portion 53 gradually expands. Along with this, the straight portion 102 moves toward the slot 22 of the stator core 2, which communicates with the comb-toothed groove 43, while being guided by the comb-shaped groove 43. This allows the straight portion 102 of the strip coil 100 to be inserted into the slot 22 of the stator core 2 through the opening 22a of the slot 22 without interfering with the slot 22 (coil expansion step).

Figure 25:
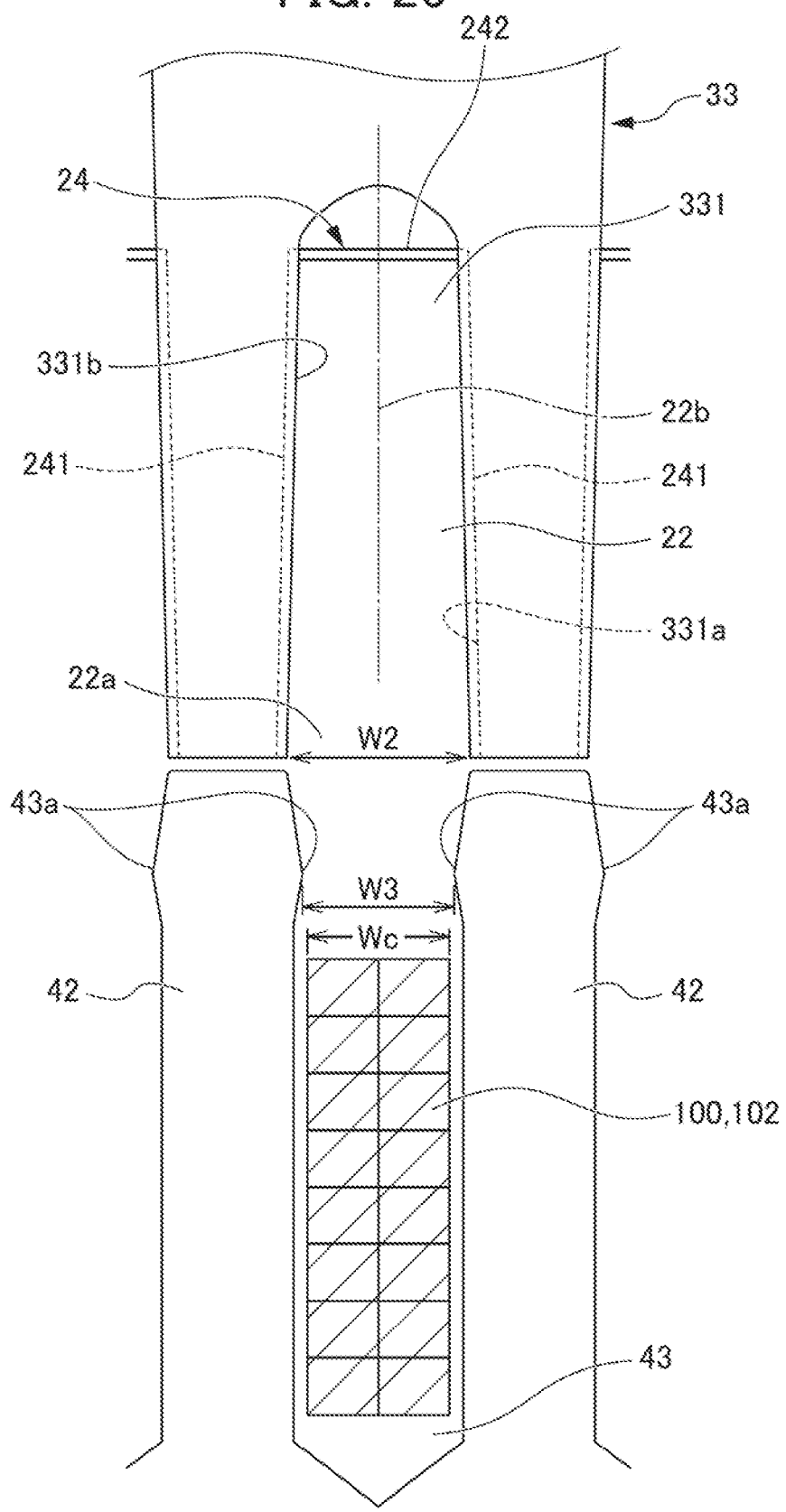
FIG. 25 shows a comb-toothed groove of the coil winding jig and a guide groove of the guide member.

Here, as shown in FIG. 25, the comb-toothed groove 43 of the coil winding jig 4 has a reduced width portion 43a on an outer diameter side. The groove width W3 of the reduced width portion 43a along the circumferential direction of the coil winding jig 4 is narrower than the groove width W2 of the coil guide groove 331b of the guide groove 331 of the cuff guide 33. However, the groove width W3 of the reduced width portion 43a is substantially equal to the width Wc of the straight portion 102 of the strip coil 100. This allows the position of the straight portion 102 to be corrected to be aligned with a slot center line 22b that passes through the center of the opening 22a of the slot 22 just before the straight portion is inserted into the slot 22 when the straight portion 102 in the comb-toothed groove 43, which moves toward the slot 22, passes through the reduced width 43a. Thus, the straight portion 102 in the comb-toothed groove 43 is smoothly inserted inside the insulating paper 24 through the opening 2a of the slot 22.

Figure 26:
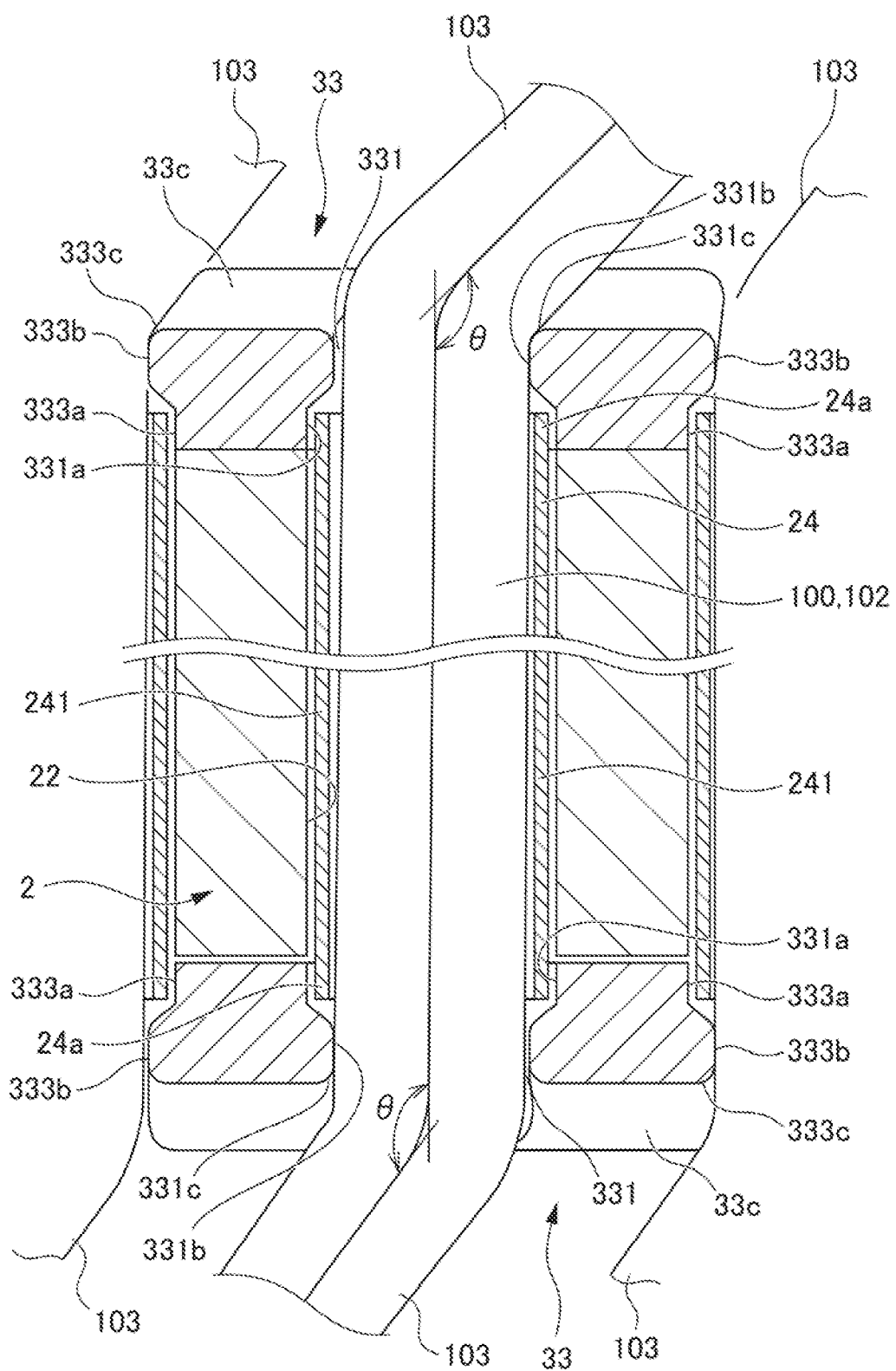
FIG. 26 is a sectional view showing that a straight portion of the strip coil is guided by the guide groove of the guide member at P1 in FIG. 6.

As shown in FIG. 26, the straight portions 102, which pass through the openings 22a of the slots 22, are each guided along the coil guide groove 331b or the overhang 333b by moving through the slot 22 while contacting the coil guide groove 331b or the overhang 333b in the guide groove 331 of the cuff guide 33. Since the width of the coil guide groove 331b is narrower than that of the cuff support groove 331a, the cuff 24a supported by the cuff support groove 331a does not contact the straight portion 102. Therefore, the straight portion 102 inserted into the slot 22 is prevented from biting the cuff 24a of the insulating paper 24.

As shown in FIG. 26, the coil ends 103 of the strip coil 100 with the straight portions 102 inserted into the slots 22 each extend outward bending from the guide groove 331 of the cuff guide 33 or from between adjacent cuff guides 33, 33. The coil ends 103 each contact a corner 331c between the coil guide groove 331b in the guide groove 331 and the tapered face 33c or a corner 333c between the overhang 333b and the tapered face 33c (position P1 in FIG. 6). The strip coil 100 gradually increases in diameter as the straight portions 102 are inserted deeper into the slots 22 along an insertion direction, and the distance between the straight portions 102, 102 adjacent to each other in a circumferential direction widens. Thus, the strip coil 100 deforms such that the inner angle 9 formed by the coil end 103 and the straight portion 102 gradually increases. At this time, the straight portion 102 in the slot 22 is subjected to stresses that try to bend the straight portion 102 in the circumferential direction of the stator core 2. If the straight portion 102 bends in the slot 22, it may contact the radial portion 241 of the insulating paper 24 in the slot 22 and damage the insulating paper 24.

Figure 27:
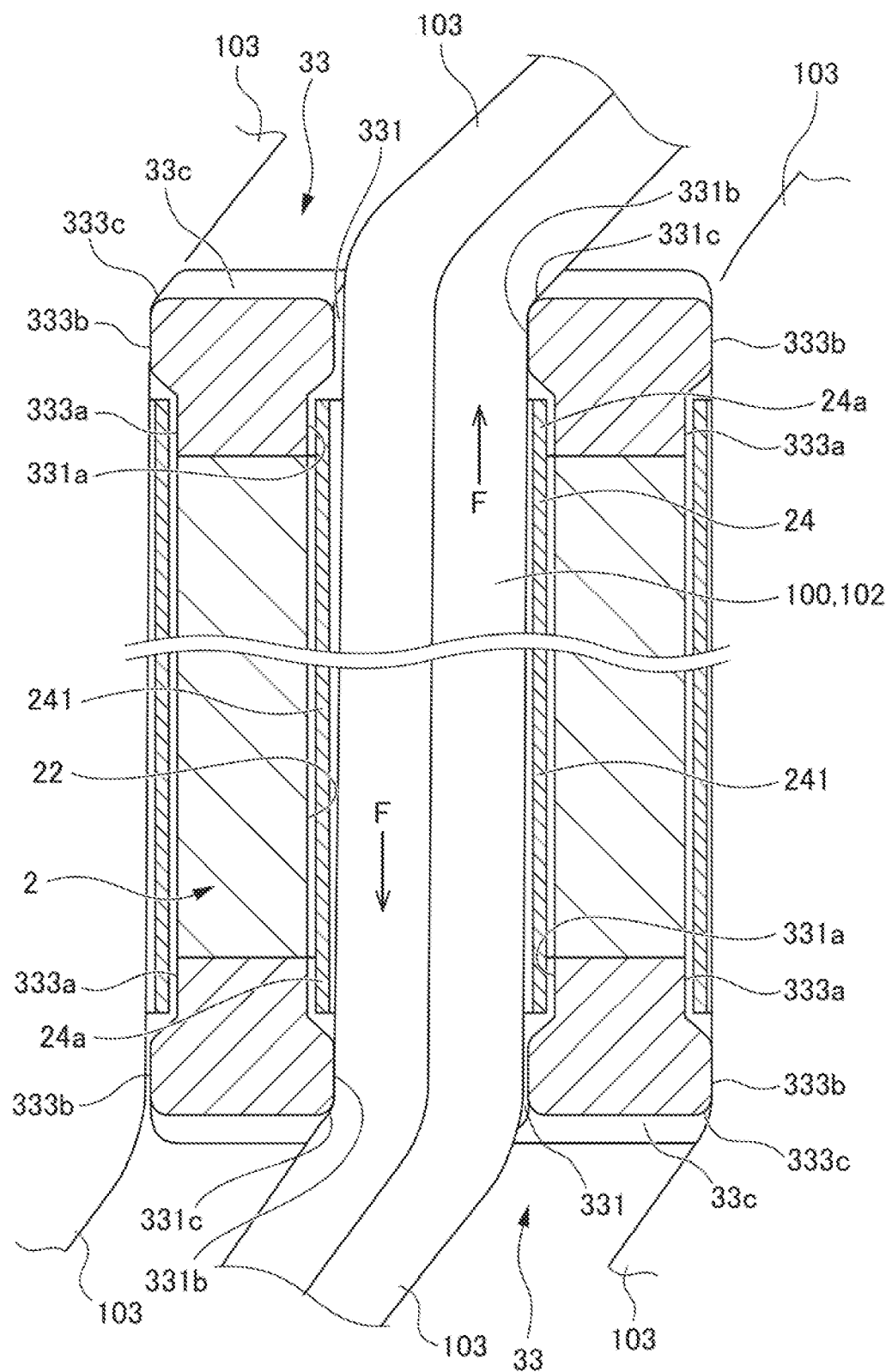
FIG. 27 is a sectional view showing that the straight portion of the strip coil is guided by the guide groove of the guide member at P2 in FIG. 6.

Since the cuff guide 33 of this embodiment has the tapered face 33c, the cuff guide 33 is formed so that the height from the end face 2a gradually increases from the opening 22a of the slot 22 along the insertion direction of the straight portion 102 of the strip coil 100. Therefore, the corners 331c, 333c, which contact the strip coil 100, are also formed along the tapered face 33c and slope away from the end face 2a. Thus, as the straight portion 102 is inserted deeper into the slot 22, the coil ends 103, 103 at both ends of the straight portion 10 are subjected to tension F along the axial direction (vertical direction in FIG. 27) of the stator core 2, using the corners 331c, 333c as fulcrums (position P2 in FIG. 6). This allows the straight portion 102 in the slot 22 to be extended straight and prevents the straight portion 102 from bending and damaging the insulating paper 24 when the straight portion 102 moves through the slot 22.

In the coil guide groove 331b of the guide groove 331, the corners 331c, 333c, which are contact parts with the strip coil 100, are formed in a curved shape. Thus, even if the coil end 103 contacts the corner 331c, damage to a protective coating formed on the surface of the strip coil 100 is suppressed. The entire coil guide groove 331b and overhang 333b may be formed in a curved arc shape.

Figure 28:
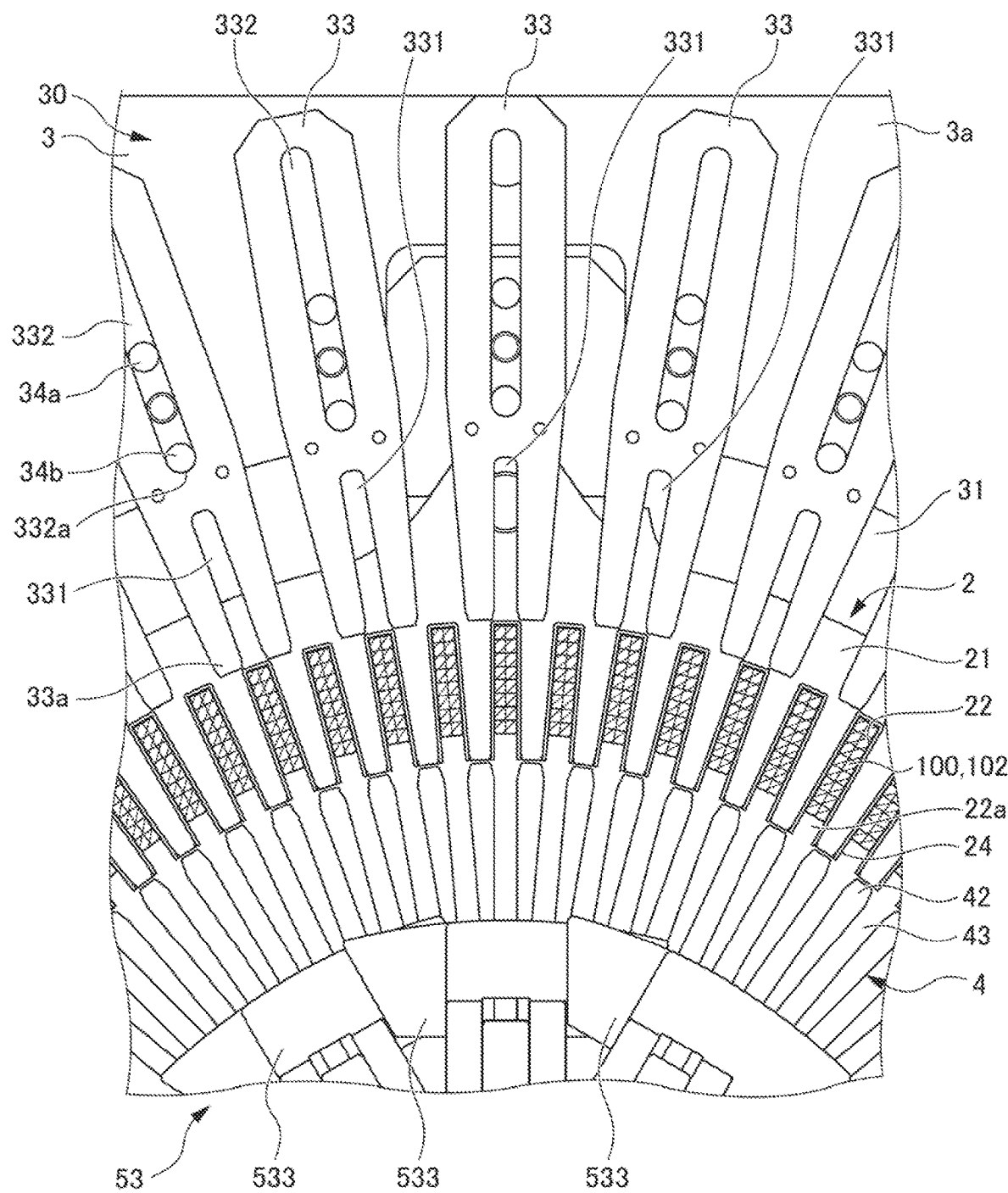
FIG. 28 is an enlarged partial view showing a state in which the guide member is retracted after the strip coil is inserted into the slots.

As shown in FIG. 28, when the coil expansion portions 53 of the two coil expansion mechanisms 5 are each at their widest diameter, the straight portions 102 of the strip coil 100 are completely inserted into the slots 22 of the stator core 2 from the coil winding jig 4. Thus, the strip coil 100 is mounted in the slots 22 of the stator core 2. The coil expansion portions 53 of the two coil expansion mechanisms 5 may operate to increase in diameter simultaneously or sequentially with a time lag so that the straight portions 102 are inserted into the openings 22a of the slots 22 obliquely in a radial direction.

Figure 29:
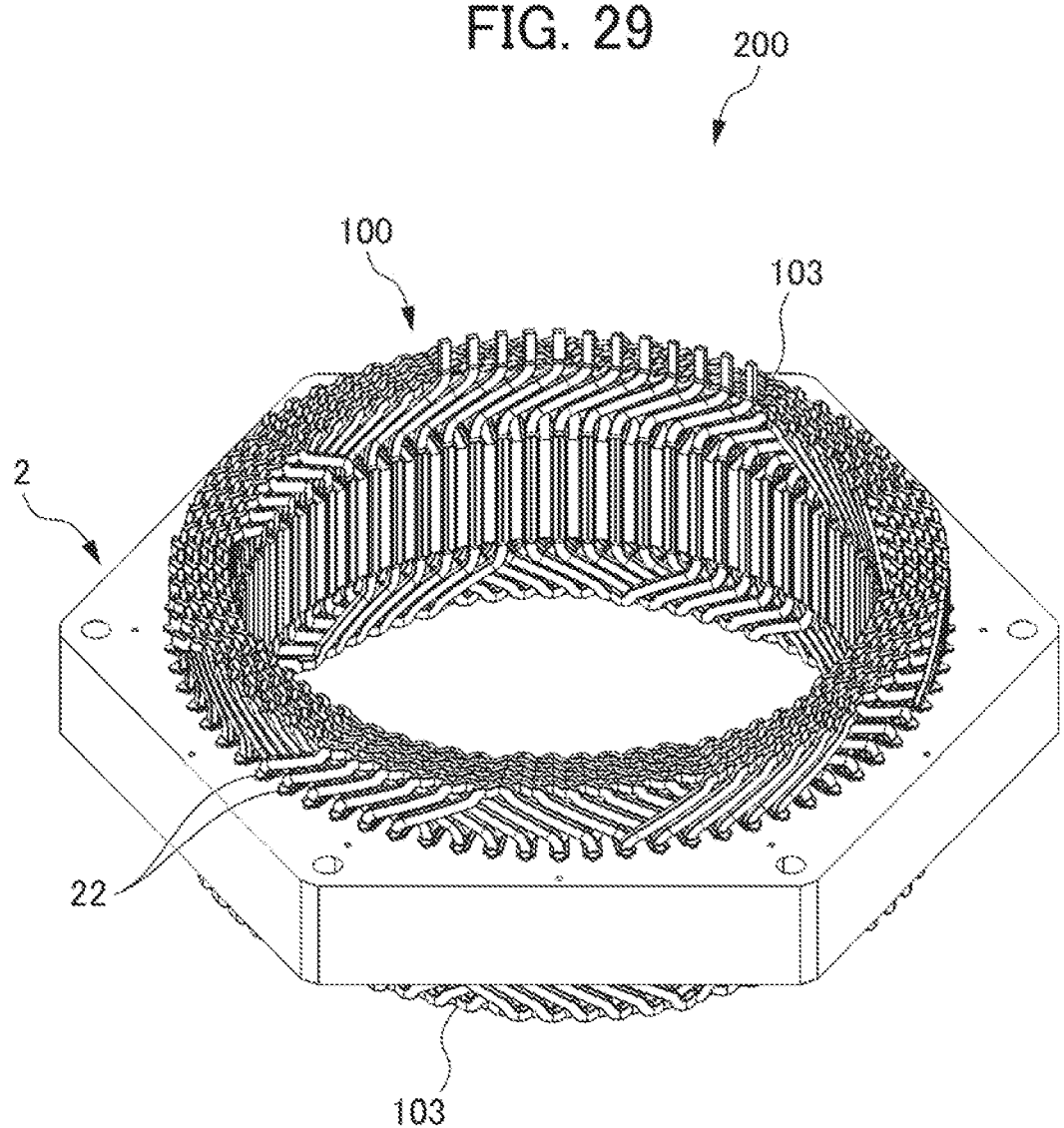
FIG. 29 is a perspective view of a stator with the strip coil mounted in the slots along a circumferential direction.

Thereafter, the cuff guides 33 move outward in a radial direction to completely retract from the end face 2a of the stator core 2, and the coil expansion portions 53 reduce in diameter, and the coil expansion devices 5 separate from the coil winding jig 4. Thus, as shown in FIG. 29, a stator 200 is obtained with the strip coil 100 mounted in the slots 22 of the stator core 2.

As described above, the coil insertion guide device 30 of this embodiment includes the positioning jig 3 that positions the stator core 2 in which the insulating papers 24, which are insulating members, are respectively inserted into the plurality of slots 22 having the openings 22a that open in a radial direction (Y direction); and the cuff guides 33 that are guide members provided to the positioning jig 3 so as to be able to contact the end face 2a of the stator core 2 in the axial direction (Z direction). The straight portions 102 of the strip coil 100 that are inserted into the slots 22 along the radial direction of the stator core 2 are guided by the cuff guides 33. The cuff guide 33 includes the guide groove 331. The guide groove 331 includes, on the side close to the end face 2a of the stator core 2, the cuff support groove 331a that communicates with the slot 22 and houses and supports the cuff 24a of the insulating paper 24 that protrudes from the end face 2a of the stator core 2, and on the side far from the end face 2a, the coil guide groove 331b that protrudes toward the inside of the slot 22 more than the cuff support groove 331a and contacts the strip coil 100 to guide the movement of the straight portion 102 of the strip coil 100. According to this structure, the cuff 24a of the insulating paper 24, which is inserted into the slot 22 beforehand, is supported by the cuff support groove 331a of the guide groove 331 of the cuff guide 33, so that the cuff 24a is positioned with respect to the slot 22. Furthermore, the movement of the straight portion 102 of the strip coil 100 in the slot 22 is guided without biting the cuff 24a by the contact of the strip coil 100 with the coil guide groove 331b of the guide groove 331. This prevents the strip coil 100 from biting the insulating paper 24 in the slot 22 when the straight portion 102 of the strip coil 100 is inserted into the slot 22.

In the coil insertion guide device 30 of this embodiment, the cuff guide 33 is formed so as to gradually increase in height from the end face 2a from the opening 2a of the slot 22 along the insertion direction of the strip coil 100. The movement of the strip coil 100 is guided so that tension F along the axial direction of the stator core 2 is applied along with the movement of the straight portion 102 of the strip coil 100 in the slot 22 guided by the coil guide groove 331b. According to this structure, as the straight portion 102 of the strip coil 100 is inserted into the slot 22, tension F along the axial direction of the stator core 2 is applied to the straight portion 102 in the slot 22. This suppresses the bending of the straight portion 102 in the slot 22. Thus, damage to the insulating paper 24 caused by interference between the straight portion 102 and the insulating paper 24 in the slot 22 is suppressed.

In the coil insertion guide device 30 of this embodiment, the corners 331c, 333c of the coil guide groove 331b, which are contact parts with the strip coil 100, have a curved shape. This suppresses damage to the protective coating on the surface of the strip coil 100.

The coil insertion guide method of this embodiment guides the movement of the strip coil 100 that is inserted along the radial direction of the stator core 2 into the plurality of slots 22 of the stator core 2 into which the insulating papers 24, which are insulating members, are respectively inserted. The slots 22 each have the opening 22a that opens in a radial direction (Y direction). The cuff guide 33, which is a guide member, including the guide groove 331 including, on the side close to the end face 2a of the stator core 2 in the axial direction, the cuff support groove 331a that communicates with the slot 22 and houses and supports the cuff 24a of the insulating paper 24 that protrudes from the end face 2a, and on the side far from the end face 2a, the coil guide groove 331b that protrudes toward the inside of the slot 22 more than the cuff support groove 331a and contacts the strip coil 100 to guide the movement of the strip coil 100, is brought into contact with the end face 2a. The cuff support groove 331a supports the cuff 24a, and the coil guide groove 331b guides the movement of the strip coil 100 that is inserted into the slot 22. According to this structure, the cuff 24a of the insulating paper 24, which is inserted into the slot 22 beforehand, is supported by the cuff support groove 331a of the guide groove 331 of the cuff guide 33, so that the cuff 24a is positioned with respect to the slot 22. Furthermore, the movement of the straight portion 102 of the strip coil 100 in the slot 22 is guided without biting the cuff 24a by the contact of the strip coil 100 with the coil guide groove 331b of the guide groove 331. This prevents the strip coil 100 from biting the insulating paper 24 in the slot 22 when the straight portion 102 of the strip coil 100 is inserted into the slot 22.

In the coil insertion guide method of this embodiment, the cuff guide 33 is formed so as to gradually increase in height from the end face 2a from the opening 2a of the slot 22 along the insertion direction of the strip coil 100. The movement of the strip coil 100 is guided so that tension F along the axial direction of the stator core 2 is applied to the straight portion 102 of the strip coil 100 along with the movement of the straight portion 102 of the strip coil 100 in the slot 22 guided by the coil guide groove 331b. According to this structure, as the straight portion 102 of the strip coil 100 is inserted into the slot 22, tension F along the axial direction of the stator core 2 is applied to the straight portion 102 in the slot 22. This suppresses the bending of the straight portion 102 in the slot 22 and damage to the insulating paper 24 caused by interference between the straight portion 102 and the insulating paper 24 in the slot 22.

Although the coil mounting apparatus 1 of the embodiment described above is configured so that the axial directions of the stator core 2 and the coil winding jig 4 are arranged in a horizontal direction, it may be configured so that the axial directions of the stator core 2 and the coil winding jig 4 are arranged in a direction other than the horizontal direction, such as a vertical direction.

The coil winding jig 4, on which the strip coil 100 is wound in a circular shape, may be inserted inside the stator core 2 fixed to the positioning jig 3 while being attached to and held by the holding portion 5 of either one of the coil expansion devices 5.

In the coil insertion guide device 30, an equal number of the cuff guides 33 corresponding to the number of the slots 22 of the stator core 2 may be provided on both end faces 3a, 3a of the positioning jig 3.

EXPLANATION OF REFERENCE NUMERALS 2 stator core
2a end face
22 slot
24 insulating paper (insulating member)
24a cuff
3 positioning jig
30 coil insertion guide device
33 cuff guide (guide member)
331 guide groove
331a cuff support groove
331b coil guide groove
100 strip coil
F tension

What is claimed is:

1. A coil insertion guide device, comprising:
a positioning jig that positions a stator core comprising a plurality of slots each having an opening that opens inward in a radial direction of the stator core and insulating members being respectively inserted into the slots; and
the positioning jig comprising guide members provided in the positioning jig so as to be able to contact an end face of the stator core in an axial direction of the stator core,
wherein the guide members are configured to guide a coil as portions of the coil are inserted into the slots along the radial direction of the stator core, and
the guide members each comprising a guide groove,
the guide grooves each comprising, on a side of the guide members close to the end face of the stator core, a cuff support groove that communicates with one of the slots and houses and supports a cuff of one of the insulating members that protrudes from the end face of the stator core, and on a side of the guide members far from the end face, a coil guide groove that protrudes toward an inside of the slot more than the cuff support groove and contacts the coil to guide movement of the coil along the radial direction of the stator core as the portions of the coil are inserted into the slots.

2. The coil insertion guide device according to claim 1, wherein the guide members are formed so as to gradually increase in height from the end face from the opening of the slot along an insertion direction of the coil, and guides the movement of the coil so that tension along the axial direction of the stator core is applied to the portions of the coil inserted into the slots along with the movement of the coil in the slot guided by the coil guide grooves.

3. The coil insertion guide device according to claim 1, wherein a part of the coil guide grooves that contacts the coil have a curved shape.

4. A coil insertion guide method that guides movement of a coil inserted along a radial direction of a stator core into a plurality of slots of the stator core into which insulating members are respectively inserted, the slots each having an opening that opens inward in the radial direction of the stator core, the method comprising:
positioning a stator core using a positioning jig;
contacting guide members of the positioning jig with an end face of the stator core in an axial direction of the stator core, the guide members each comprising a guide groove comprising, on a side of the guide members close to the end face, a cuff support groove that communicates with one of the slots and houses and supports a cuff of one of the insulating members that protrudes from the end face, and on a side of the guide members far from the end face, a coil guide groove that protrudes toward an inside of the slot more than the cuff support groove and contacts the coil to guide the movement of the coil along the radial direction of the stator core as portions of the coil are inserted into the slots; and
supporting the cuffs of the insulating members by the cuff support groove, and guiding by the coil guide grooves the movement of the portions of the coil as the portions are inserted into the slots of the stator core along the radial direction of the stator core.

5. The coil insertion guide method according to claim 4, wherein the guide members are formed so as to gradually increase in height from the end face from the opening of the slot along an insertion direction of the coil, and the movement of the coil is guided so that tension along the axial direction of the stator core is applied to the portions of the coil inserted into the slots of the coil along with the movement of the coil in the slot guided by the coil guide grooves.

* * * * *